United States Patent
Kuppe et al.

(10) Patent No.: US 12,319,605 B2
(45) Date of Patent: Jun. 3, 2025

(54) METHOD FOR PRODUCING A HEADLIGHT LENS FOR A VEHICLE HEADLIGHT

(71) Applicant: Docter Optics SE, Neustadt an der Orla (DE)

(72) Inventors: Alexander Kuppe, Neustadt an der Orla (DE); Thomas Walther, Neustadt an der Orla (DE); Hagen Goldammer, Neustadt an der Orla (DE)

(73) Assignee: Docter Optics SE, Neustadt an der Orla (DE)

( * ) Notice: Subject to any disclaimer, the term of this patent is extended or adjusted under 35 U.S.C. 154(b) by 491 days.

(21) Appl. No.: 17/626,118

(22) PCT Filed: Jul. 11, 2020

(86) PCT No.: PCT/DE2020/100609
§ 371 (c)(1),
(2) Date: Jan. 10, 2022

(87) PCT Pub. No.: WO2021/008657
PCT Pub. Date: Jan. 21, 2021

(65) Prior Publication Data
US 2022/0289614 A1   Sep. 15, 2022

(30) Foreign Application Priority Data

Jul. 13, 2019   (DE) .................... 10 2019 119 040.1
Apr. 1, 2020    (DE) .................... 10 2020 109 123.0
Jun. 5, 2020    (DE) .................... 10 2020 115 083.0

(51) Int. Cl.
C03B 23/00   (2006.01)
C03B 11/08   (2006.01)
F21S 41/27   (2018.01)

(52) U.S. Cl.
CPC .......... *C03B 23/0013* (2013.01); *C03B 11/08* (2013.01); *C03B 23/0093* (2013.01);
(Continued)

(58) Field of Classification Search
None
See application file for complete search history.

(56) References Cited

U.S. PATENT DOCUMENTS

| 821,610 A | 5/1906 | Cox |
|---|---|---|
| 4,666,496 A | 5/1987 | Fecik |

(Continued)

FOREIGN PATENT DOCUMENTS

| CN | 205049796 | 2/2016 |
|---|---|---|
| CN | 105819674 | 8/2016 |

(Continued)

OTHER PUBLICATIONS

JP H07118026 machine translation, Mitsusaka Motosuke et al., Mold for Forming Optical Element, May 1995 (Year: 1995).*

(Continued)

*Primary Examiner* — Queenie S Dehghan
(74) *Attorney, Agent, or Firm* — Carter, DeLuca & Farrell LLP

(57) ABSTRACT

The present disclosure provides a suitable method for producing a headlight lens for a vehicle headlight, for example for a motor-vehicle headlight, wherein the headlight lens comprises an integral body made of glass, wherein the integral body comprises at least one light tunnel and one light-passage section having at least one optically active light exit surface, wherein the light tunnel comprises at least one light entry surface and, with a bend, transitions into the light-passage section in order to image the bend as a bright-dark-boundary by means of light directed into the light entry surface.

15 Claims, 21 Drawing Sheets

(52) U.S. Cl.
CPC ......... *F21S 41/27* (2018.01); *C03B 2215/412* (2013.01); *C03B 2215/49* (2013.01); *C03B 2215/50* (2013.01); *C03B 2215/70* (2013.01); *C03B 2215/78* (2013.01)

(56) References Cited

U.S. PATENT DOCUMENTS

| | | | |
|---|---|---|---|
| 5,120,343 | A | 6/1992 | Monji et al. |
| 6,130,777 | A | 10/2000 | Yamashita et al. |
| 7,798,688 | B2 | 9/2010 | Hamkens |
| 2001/0033726 | A1 | 10/2001 | Shie et al. |
| 2002/0153624 | A1 | 10/2002 | Tumlin et al. |
| 2003/0001301 | A1 | 1/2003 | Duroux et al. |
| 2004/0244421 | A1 | 12/2004 | Kato et al. |
| 2005/0054514 | A1 | 3/2005 | Ishioka et al. |
| 2009/0323502 | A1 | 12/2009 | Murata et al. |
| 2010/0246008 | A1 | 9/2010 | Murata et al. |
| 2011/0000260 | A1 | 1/2011 | Hamkens et al. |
| 2011/0266576 | A1 | 11/2011 | Engl et al. |
| 2012/0040044 | A1 | 2/2012 | Jehira et al. |
| 2013/0221551 | A1 | 8/2013 | Genda |
| 2014/0093605 | A1 | 4/2014 | Masuda |
| 2014/0332991 | A1 | 11/2014 | Giessauf et al. |
| 2015/0224723 | A1 | 8/2015 | Hamkens |
| 2017/0261169 | A1* | 9/2017 | Fedosik ................. F21S 41/27 |
| 2017/0327402 | A1 | 11/2017 | Fujii |
| 2018/0251395 | A1 | 9/2018 | Akiba et al. |
| 2018/0319048 | A1 | 11/2018 | Huang et al. |
| 2018/0328558 | A1 | 11/2018 | Okubo |
| 2019/0041556 | A1 | 2/2019 | Iwata |
| 2020/0195823 | A1 | 6/2020 | Furutake |
| 2022/0373151 | A1 | 11/2022 | Zhang et al. |

FOREIGN PATENT DOCUMENTS

| | | |
|---|---|---|
| DE | 1 099 964 | 2/1961 |
| DE | 36 02 262 | 5/1987 |
| DE | 299 14 114 | 11/1999 |
| DE | 69701714 | 2/2001 |
| DE | 102 26 471 | 1/2004 |
| DE | 10 2005 009 556 | 9/2005 |
| DE | 10 2008 034153 | 1/2010 |
| DE | 102008054029 | 5/2010 |
| DE | 102012205196 | 10/2013 |
| DE | 20 2014 100462 | 3/2014 |
| DE | 10 2015 001609 | 8/2016 |
| DE | 10 2015 007 832 | 12/2016 |
| DE | 10 2017 105 888 | 9/2018 |
| DE | 10 2015 012 324 | 6/2019 |
| DE | 10 2020 115078 | 1/2021 |
| EP | 2402140 | 1/2012 |
| EP | 2666620 | 11/2013 |
| EP | 3312501 | 4/2018 |
| EP | 3520983 | 8/2019 |
| EP | 3575362 | 12/2019 |
| JP | 01072822 | 3/1989 |
| JP | 106-286754 | 10/1994 |
| JP | H07330347 A | 12/1995 |
| JP | H0971428 | 3/1997 |
| JP | H09124325 | 5/1997 |
| JP | 2002160256 | 6/2002 |
| JP | 2006062359 | 3/2006 |
| JP | 2008001530 | 1/2008 |
| JP | 2010046895 | 3/2010 |
| JP | 2018118900 | 8/2018 |
| JP | 2019135202 | 8/2019 |
| KR | 20160028901 | 3/2016 |
| WO | 2906858 | 9/1980 |
| WO | 2004096724 | 11/2004 |
| WO | 2009/036739 | 3/2009 |
| WO | 2009/109209 | 9/2009 |
| WO | 2012/072192 | 6/2012 |
| WO | 2014/161014 | 10/2014 |
| WO | 2017/207079 | 12/2017 |
| WO | 2019/072326 | 4/2019 |
| WO | 2019072325 | 4/2019 |
| WO | 2019/179571 | 9/2019 |
| WO | 2021008647 | 1/2021 |
| WO | 2021008657 | 1/2021 |

OTHER PUBLICATIONS

DE 2906858 machine translation, Lang Geb Lahmer et al., Moulding Press for Glass, Sep. 1980 (Year: 1980).*
WO 2013/170923 machine translation, Wintzer et al., Method for producing a headlamp lens, Nov. 2013 (Year: 2013).*
CN105026210 machine translation, Wintzer et al., A Vehicle Headlight and a Headlight lens, Aug. 2017 (Year: 2017).*
International Preliminary Report on Patentability Issued on Jul. 19, 2022 For Corresponding PCT Application No. PCT/DE2021/100035.
International Search Report and Written Opinion Issued May 25, 2021 For PCT/DE2021/100136.
International Preliminary Report on Patentability Issued in Corresponding PCT Application No. PCT/DE2021/100136 Dated Aug. 23, 2022.
International Search Report and Written Opinion Issued May 20, 2019 for Corresponding PCT Application No. PCT/DE2019/100249.
International Preliminary Report on Patentability Issued on Jan. 18, 2022 in Corresponding PCT Application No. PCT/DE2020/100478.
International Search Report and Written Opinion Issued on Sep. 16, 2020 in Corresponding PCT Application No. PCT/DE2020/100478.
International Preliminary Report on Patentability Issued on Sep. 22, 2020 for Corresponding PCT Application No. PCT/DE2019/100249.
German Office Action Dated Jul. 13, 2021 for Corresponding Patent Application No. DE 10 2020 127 638.9.
International Search Report and Written Opinion Issued on Feb. 4, 2022 for Corresponding PCT Application No. PCT/DE2021/100840.
International Search Report and Written Opinion Issued on Oct. 16, 2020 in Corresponding PCT Application No. PCT/DE2020/100609.
Office Action Dated Mar. 20, 2020 for Corresponding Patent Application No. DE 10 2019 119 040.1.
Office Action Dated Feb. 19, 2020 for Corresponding Patent Application No. DE 10 2019 119 042.8.
International Preliminary Report on Patentability Issued on Jan. 18, 2022 in Corresponding PCT Application No. PCT/DE2020/100609.
International Search Report and Written Opinion Issued Feb. 1, 2022 for Corresponding PCT Application No. PCT/DE2021/100858.
Audi—Vorsprung durch Technik, http://web.archive.org/web/20150109234745/http://www.audi.de/content/de/brand/de/vorsprung_durch_technik/content/2013/08/Audi-A8-erstrahlt-in-ne, May 22, 2023.
Vehicle Bodies, Bosch Automotive Handbook, 9th Edition, 2014, p. 1040.
Digital Light: Millions of Pixels on the Road, https://www.al-lighting.com/news/article/digital-light-millions-of-pixels—Oct. 31, 2018.
Hella bringt neues SSL-HD-Matrix-Lichtsystem auf den Markt, https://www.springerprofessional.de/fahrzeug-lichttechnik/fahrzeugsicherheit/hella-bringt-neues-ssl-hd-matrix-lichtsystem-auf-den-markt/17182758, Sep. 18, 2019.
Von Alfred Vollmer, "Matrix-LED—und Laserlicht bietet viele Vorteile", https://www.all-electronics.de/automotive-transportation/matrix-led-und-laserlicht-bietet-viele-vorteile.html, Apr. 15, 2014.
SSL|HD: hochintegriertes HD-LED—Lichtsystem von Hella, https://www.highlight-web.de/5874/hella-ssl-hd/, Sep. 13, 2019.
Hopmann, Christian et al., "Technologie des Spritzgießens" Lern— und Arbeitsbuch, 2017, pp. 19, 29, 57-59, 64-70.
Unser Digital Light SSL | HD-Lichtsystem: ein neuer Meilenstein der automobilen Lichttechnik | HELLA, https://www.hella.com/techworld/de/Lounge/Unser-Digital-Light-SSL-HD-Lichtsystem-ein-neuer-Meilenstein-der-automobilen-Lichttechnik-55548/, 11 pages.
International Preliminary Report on Patentability Issued May 8, 2023 for PCT/DE2021/100858.

(56) References Cited

OTHER PUBLICATIONS

International Search Report and Written Opinion Issued on Apr. 8, 2021 for Corresponding Patent Application No. PCT/DE2020/101007.
International Preliminary Report on Patentability Issued on May 17, 2022 for Corresponding Patent Application No. PCT/DE2020/101007.
International Search Report and Written Opinion Issued on Jan. 26, 2021 for Corresponding Patent Application No. PCT/DE2020/100860.
International Preliminary Report on Patentability Issued on Apr. 12, 2022 for Corresponding Patent Application No. PCT/DE2020/100860.
Search Report Issued on Nov. 22, 2021 For Corresponding Patent Application No. DE 10 2021 105 560.1.
International Search Report and Written Opinion Issued May 6, 2021 for PCT/DE2021/100035.

\* cited by examiner

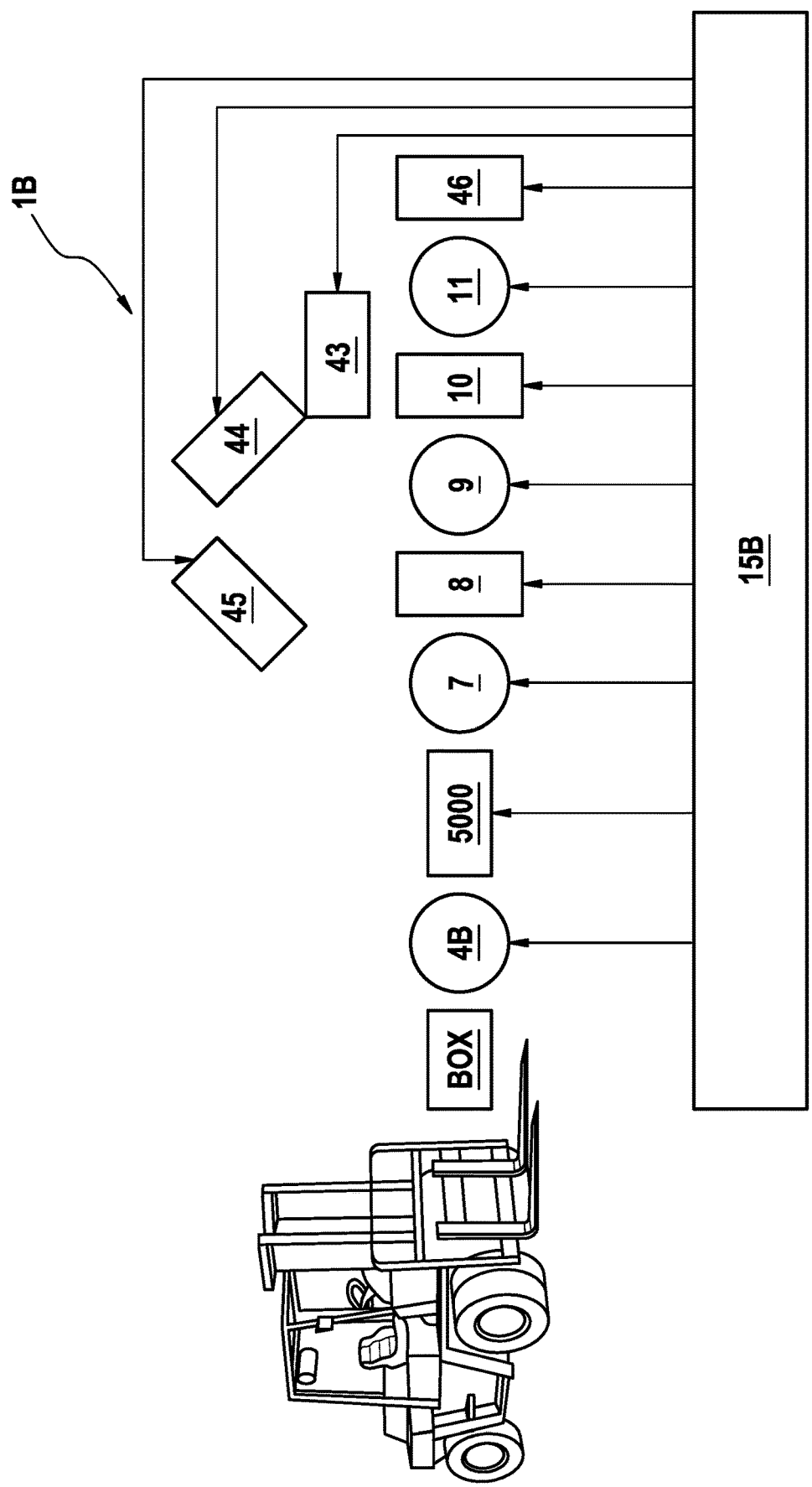

A - A

METHOD FOR PRODUCING A HEADLIGHT
LENS FOR A VEHICLE HEADLIGHT

FIELD OF THE INVENTION

The disclosure relates to a method for producing a headlight lens for a vehicle headlight, for example for a motor-vehicle headlight, for example a headlight lens, as disclosed in WO 2017/207079 A1, wherein the headlight lens comprises an integral body made of glass, wherein the body comprises at least one light tunnel and one light-passage section having at least one optically active light exit surface, wherein the light tunnel comprises at least one light entry surface and, with a bend, transitions into the light-passage section in order to image the bend as a bright-dark-boundary by means of light coupled or directed into the light entry surface.

BACKGROUND

WO 2009/036739 A1 discloses a method for producing a headlight lens for a vehicle headlight, for example for a motor vehicle, wherein a blank made of glass is heated such that it has a viscosity of between $10^4$ Pa*s and $10^5$ Pa*s, for example of between $10^4$ Pa*s and $5 \cdot 10^4$ Pa*s, and wherein, after being heated, the blank is pressed in an injection press mold to form a headlight lens.

SUMMARY

The present disclosure concerns a method for producing a headlight lens for a vehicle headlight, for example for a motor-vehicle headlight, wherein the headlight lens comprises an integral body made of glass, wherein the integral body comprises at least one light tunnel and one light-passage section having at least one optically active light exit surface, wherein the light tunnel comprises at least one light entry surface and, with a bend, transitions into the light-passage section in order to image the bend as a bright-dark-boundary by means of light directed into the light entry surface. According to illustrative embodiments a first partial mold is provided with a heated blank, wherein the blank is press-molded to form the headlight lens using the first partial mold.

BRIEF DESCRIPTION OF THE DRAWINGS

FIG. 9B is a schematic view of a device for producing motor-vehicle headlight lenses or lens-like free-forms for motor-vehicle headlights or optical elements made of glass.

DETAILED DESCRIPTION

Figure 1:
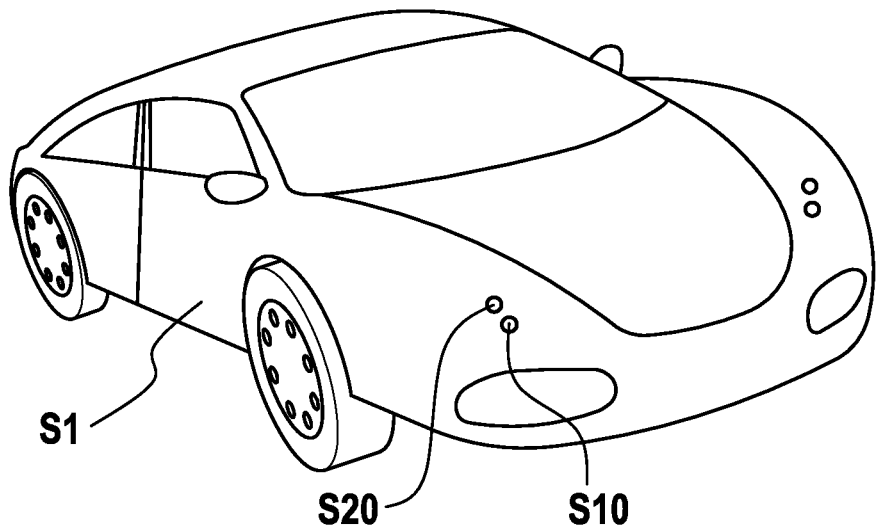
FIG. 1 shows an embodiment of a motor vehicle.

The present disclosure concerns a method for producing a headlight lens for a vehicle headlight, for example for a motor-vehicle headlight, wherein the headlight lens comprises an integral body made of glass, wherein the integral body comprises at least one light tunnel and one light-passage section having at least one optically active light exit surface, wherein the light tunnel comprises at least one light entry surface and, with a bend, transitions into the light-passage section in order to image the bend as a bright-dark-boundary by means of light directed into the light entry surface, wherein a first partial mold is provided with a heated blank, and wherein the blank is press-molded to form the headlight lens using the first partial mold.

According to an illustrative embodiment the outside of the blank is hotter than the inside of the blank immediately before the press-molding.

According to a further illustrative embodiment the first partial mold comprises structures that are impressed in the headlight lens in the form of orienting structures, such as raised portions or indentations, for the purpose of orienting the headlight lens or for orienting the headlight lens in a vehicle headlight and/or for orienting the headlight lens relative to a light source for directing light into the light entry surface. In this case, the headlight lens is for example oriented by a housing part that mechanically connects the headlight lens to the light source being oriented by means of the orienting structure. Within the meaning of this disclosure, an orienting structure may be or comprise a contact element or contact structure or contact surface for the corresponding housing part. Within the meaning of this disclosure, a housing part is for example an element or component that mechanically connects the headlight lens to the light source. Suitable orienting structures are e.g. disclosed in U.S. Pat. No. 9,732,924 B2 (incorporated by reference in its entirety).

According to a further illustrative embodiment the blank (or gob or preform) has a first region on its surface in which the value $\log(\eta/(Ps*s))$ is no greater than 11.25. According to a further illustrative embodiment the blank (or gob or preform) has a second region on its surface in which the value $\log(\eta/(Ps*s))$ is no less than 4.75. $\eta$ denotes the viscosity in the unit Ps*s.

According to a further illustrative embodiment the viscosity in the first region is greater than in the second region.

According to a further illustrative embodiment the first region is on the underside of the blank.

According to a further illustrative embodiment the second region is on the upper side of the blank.

According to a further illustrative embodiment the blank (or gob or preform) has a first region on its surface in which the value $\log(\eta/(Ps*s))$ is no greater than 9.5. According to a further illustrative embodiment the blank (or gob or preform) has a second region on its surface in which the value $\log(\eta/(Ps*s))$ is no less than 5.75.

According to a further illustrative embodiment the blank (or gob or preform) has a first region on its surface in which the value $\log(\eta/(Ps*s))$ is no greater than 8.25. According to a further illustrative embodiment the blank (or gob or preform) has a second region on its surface in which the value $\log(\eta/(Ps*s))$ is no less than 7.6.

According to a further illustrative embodiment a second partial mold and a third partial mold are provided, wherein the blank is press-molded using the second partial mold and the third partial mold.

According to a further illustrative embodiment a second partial mold for molding the light tunnel and a third partial mold for molding a part of the light-passage section are provided, wherein the blank is press-molded using the second partial mold and the third partial mold.

According to a further illustrative embodiment the light tunnel or at least a part of the light tunnel is molded by means of the second partial mold.

According to a further illustrative embodiment a part of the light-passage section is molded by means of the third partial mold. According to a further illustrative embodiment a part of the light-passage section is molded by means of the second partial mold. According to a further illustrative embodiment the bend is molded or shaped by means of the second mold.

According to a further illustrative embodiment the second partial mold and the third partial mold are moved towards one another orthogonally to the movement direction of the first partial mold so as to be regulated and/or controlled in distance or speed in order to press the headlight lens.

According to a further illustrative embodiment after closing a cavity formed by the second partial mold and the third partial mold, the first partial mold is moved towards the cavity so as to be controlled and/or regulated in terms of pressure and/or force.

According to a further illustrative embodiment a ram is pressed against the second partial mold and the third partial mold counter to the movement direction of the first partial mold.

Details on the production of blanks, for heating blanks or for reversing the temperature gradient in a blank can be found in WO 2019/072326 A1 (incorporated by reference in its entirety). In addition, details on the cooling after pressing can be found in WO 2019/072326 A1. Details relating to headlight lenses can be found in WO 2017/207079 A1 (incorporated by reference in its entirety).

According to a further illustrative embodiment the first partial mold is moved by means of a first actuator for moving the first partial mold by the first partial mold and the first actuator being connected by means of a first movable guide rod and at least one second movable guide rod, for example at least one third movable guide rod, wherein the first movable guide rod is guided in a (first) recess in a fixed guide element and the second movable guide rod is guided in a (second) recess in the fixed guide element and the optional third movable guide rod is guided in a (third) recess in the fixed guide element, wherein it is for example provided that the deviation in the position of the first partial mold orthogonally to the movement direction of the first partial mold from the target position of the first partial mold orthogonally to the movement direction of the first mold is no greater than 20 μm, for example no greater than 15 μm, for example no greater than 10 μm.

According to a further illustrative embodiment the ram is moved by means of a second actuator for moving the ram in a frame, which comprises a first fixed guide rod, at least one second fixed guide rod and for example at least one third guide rod, wherein the first fixed guide rod, the at least one second fixed guide rod and the optional at least one third guide rod are connected at one end by an actuator-side fixed connector and at the other end by a mold-side fixed connector, wherein the ram is fixed to a movable guide element, which comprises a (first) recess through which the first fixed guide rod is guided, another (second) recess through which the at least one second fixed guide rod is guided, and optionally another (third) recess through which the optional third fixed guide rod is guided, wherein it is for example provided that the deviation in the position of the mold orthogonally to the movement direction of the ram from the target position of the ram orthogonally to the movement direction of the ram is no greater than 20 μm, for example no greater than 15 μm, for example no greater than 10 μm.

According to a further illustrative embodiment the deviation in the position of the first partial mold and/or the ram orthogonally to the (target) pressing direction or the (target) movement direction of the first partial mold and/or the ram from the target position of the first partial mold and/or the ram orthogonally to the (target) pressing direction or the (target) movement direction of the first partial mold and/or the ram is no greater than 20 µm, for example no greater than 15 µm, for example no greater than 10 µm.

According to a further illustrative embodiment the blank made of glass is press-molded such that a or the angle between the target pressing direction of the first partial mold and the actual pressing direction of the first partial mold is no greater than $10^{-2}$ degree, for example no greater than $5 \cdot 10^{-3}$ degree.

According to a further illustrative embodiment the blank made of glass is press-molded such that a or the angle between the target pressing direction of the ram and the actual pressing direction of the ram is no greater than $10^{-2}$ degree, for example no greater than $5 \cdot 10^{-3}$ degree.

According to a further illustrative embodiment the blank made of glass is press-molded such that the first actuator is decoupled from torsion from the mold-side movable connector and/or the first partial mold (for example by means of a decoupler, which for example comprises a ring and/or at least one first disc as well as optionally at least one second disc, wherein it may be provided that the ring surrounds the first and/or second disc).

According to a further illustrative embodiment the blank made of glass is press-molded such that the second actuator is decoupled from torsion from the mold-side movable guide element and/or the ram (for example by means of a decoupler, which for example comprises a ring and/or at least one first disc as well as optionally at least one second disc, wherein it may be provided that the ring surrounds the first and/or second disc).

According to a further illustrative embodiment the second partial mold is moved by means of an actuator for moving the second partial mold by the second partial mold and the actuator being connected by means of a first movable guide rod and at least one second movable guide rod, for example at least one third movable guide rod, wherein the first movable guide rod is guided in a (first) recess in a fixed guide element and the second movable guide rod is guided in a (second) recess in the fixed guide element and the optional third movable guide rod is guided in a (third) recess in the fixed guide element, wherein it is for example provided that the deviation in the position of the second partial mold orthogonally to the movement direction of the second partial mold from the target position of the second partial mold orthogonally to the movement direction of the second partial mold is no greater than 20 µm, for example no greater than 15 µm, for example no greater than 10 µm.

According to a further illustrative embodiment the third partial mold is moved by means of an actuator for moving the third partial mold in a frame, which comprises a first fixed guide rod, at least one second fixed guide rod and for example at least one third guide rod, wherein the first fixed guide rod, the at least one second fixed guide rod and the optional at least one third guide rod are connected at one end by an actuator-side fixed connector and at the other end by a mold-side fixed connector, wherein the third partial mold is fixed to a movable guide element, which comprises a (first) recess through which the first fixed guide rod is guided, another (second) recess through which the at least one second fixed guide rod is guided, and optionally another (third) recess through which the optional third fixed guide rod is guided, wherein it is for example provided that the deviation in the position of the third partial mold orthogonally to the movement direction of the third partial mold from the target position of the mold orthogonally to the movement direction of the third partial mold is no greater than 20 µm, for example no greater than 15 µm, for example no greater than 10 µm.

disclosure According to a further illustrative embodiment the deviation in the position of the second partial mold and/or the third partial mold orthogonally to the (target) pressing direction or the (target) movement direction of the second partial mold and/or the third partial mold from the target position of the second partial mold and/or the third partial mold orthogonally to the (target) pressing direction or the (target) movement direction of the second partial mold and/or the third partial mold is no greater than 20 µm, for example no greater than 15 µm, for example no greater than 10 µm.

According to a further illustrative embodiment the blank made of glass is press-molded such that a or the angle between the target pressing direction of the second partial mold and the actual pressing direction of the second partial mold is no greater than $10^{-2}$ degree, for example no greater than $5 \cdot 10^{-3}$ degree.

According to a further illustrative embodiment the blank made of glass is press-molded such that a or the angle between the target pressing direction of the third partial mold and the actual pressing direction of the third partial mold is no greater than $10^{-2}$ degree, for example no greater than $5 \cdot 10^{-3}$ degree.

According to a further illustrative embodiment the blank made of glass is press-molded such that the corresponding actuator is decoupled from torsion from the mold-side movable connector and/or the second partial mold (for example by means of a decoupler, which for example comprises a ring and/or at least one first disc as well as optionally at least one second disc, wherein it may be provided that the ring surrounds the first and/or second disc).

According to a further illustrative embodiment the blank made of glass is press-molded such that the corresponding actuator is decoupled from torsion from the mold-side movable guide element and/or the third partial mold (for example by means of a decoupler, which for example comprises a ring and/or at least one first disc as well as optionally at least one second disc, wherein it may be provided that the ring surrounds the first and/or second disc).

According to a further illustrative embodiment the third partial mold is moved by means of an actuator for moving the third partial mold by the third partial mold and the actuator being connected by means of a first movable guide rod and at least one second movable guide rod, for example at least one third movable guide rod, wherein the first movable guide rod is guided in a (first) recess in a fixed guide element and the second movable guide rod is guided in a (second) recess in the fixed guide element and the optional third movable guide rod is guided in a (third) recess in the fixed guide element.

According to a further illustrative embodiment the second partial mold is moved by means of an actuator for moving the second partial mold in a frame, which comprises a first fixed guide rod, at least one second fixed guide rod and for example at least one third guide rod, wherein the first fixed guide rod, the at least one second fixed guide rod and the optional at least one third guide rod are connected at one end by an actuator-side fixed connector and at the other end by a mold-side fixed connector, wherein the second partial mold is fixed to a movable guide element, which comprises a (first) recess through which the first fixed guide rod is guided, another (second) recess through which the at least one second fixed guide rod is guided, and optionally another (third) recess through which the optional third fixed guide rod is guided.

According to a further illustrative embodiment it is provided that the fixed guide element is identical to the mold-side fixed connector or is indirectly or directly fixed thereto.

According to a further illustrative embodiment the first partial mold is a lower mold.

In another configuration of the disclosure, the maximum pressure with which the first mold and the second mold are pressed together is no less than 20,000 N, for example no less than 50,000 N.

In another configuration of the disclosure, the maximum pressure with which the first mold and the second mold are pressed together is no greater than 100,000 N.

According to a further illustrative embodiment a blank made of glass is placed onto an for example annular support surface of a carrier body, for example having a hollow cross section, and is arranged on the carrier body in a cavity in a protective cover, which is arranged in a furnace cavity, and is for example heated such that a temperature gradient is produced in the blank such that the blank is cooler in its interior than in and/or on its outer region, wherein the blank made of glass, after being heated, is press-molded, for example on both sides, to form the headlight lens.

According to a further illustrative embodiment the protective cover is removably arranged in the furnace cavity.

According to a further illustrative embodiment the protective cover is removed once a or the blank has burst open in the furnace cavity, wherein e.g. another protective cover is arranged in the furnace cavity.

In one configuration, the blank is moved into the cavity in the protective cover from above or from the side. According to a further illustrative embodiment however, the blank is moved into the cavity in the protective cover from below.

According to a further illustrative embodiment the furnace cavity comprises at least one heating coil, which surrounds the protective cover in the furnace cavity (at least) in part, wherein it is provided that the interior of the protective cover is heated by means of the at least one heating coil.

According to a further illustrative embodiment the furnace cavity comprises at least two heating coils, which can be actuated separately from one another and surround the protective cover in the furnace cavity at least in part, wherein the interior of the protective cover is heated by means of the at least two heating coils.

According to a further illustrative embodiment the protective cover is made of silicon carbide or at least comprises silicon carbide.

According to a further illustrative embodiment the furnace cavity is part of a furnace-cavity assembly, for example in the form of a carousel, having a plurality of furnace cavities, in each of which a protective cover is arranged. Because the protective covers can be rapidly replaced when positioning a blank, not only is the standstill time shortened, meaning that costs are reduced, but the quality of the optical component is also improved, since the fact that they can be rapidly replaced reduces any disruptive influences during heating or warming. This effect can be further improved by the opening in the cavity of the protective cover, which points downwards, being closed or partially closed by a closure, wherein the closure can be detached and removed by loosening a fixing means, for example one or more screws. It is for example provided here that the protective cover falls out of the furnace cavity after detaching and removing the lower cover. This ensures that a furnace or hood-type annealing furnace is put back into operation rapidly.

According to a further illustrative embodiment the support surface is cooled by means of a coolant flowing through the carrier body. According to a further illustrative embodiment the support surface spans a base surface that is not circular. In this case, a geometry of the support surface or a geometry of the base surface of the support surface is for example provided which corresponds to the geometry of the blank (to be heated), wherein the geometry is selected such that the blank rests on the outer region of its underside (underside base surface). The diameter of the underside or the underside base surface of the blank is at least 1 mm greater than the diameter of the base surface spanned (by the carrier body or its support surface). In this sense, it is for example provided that the geometry of the surface of the blank facing the carrier body or the underside base surface of the blank corresponds to the support surface or the base surface of the carrier body.

An annular support surface may comprise small discontinuities. Within the meaning of the disclosure, a base surface for example includes an imaginary surface (in the region of which the blank resting on the carrier body is not in contact with the carrier body), which lies in the plane of the support surface and is surrounded by this support surface, and the (actual) support surface. It is for example provided that the blank and the carrier body are coordinated with one another. This is for example understood to mean that the edge region of the blank rests on the carrier body on its underside. An edge region of a blank can be understood to mean the outer 10% or the outer 5% of the blank or its underside, for example.

According to an illustrative embodiment the base surface is polygon-shaped or polygonal, but for example with rounded corners, wherein it is for example provided that the underside base surface of the blank is also polygon-shaped or polygonal, but for example with rounded corners. According to a further illustrative embodiment the base surface is triangle-shaped or triangular, but for example with rounded corners, wherein it is for example provided that the underside base surface of the blank is also triangle-shaped or triangular, but for example with rounded corners. In another configuration of the disclosure, the base surface is rectangle-shaped or rectangular, but for example with rounded corners, wherein it is for example provided that the underside base surface of the blank is also rectangle-shaped or rectangular, but for example with rounded corners. According to a further illustrative embodiment the base surface is square, but for example with rounded corners, wherein it is for example provided that the underside base surface of the blank is also square, but for example with rounded corners. According to a further illustrative embodiment the base surface is oval, wherein it is for example provided that the underside base surface of the blank is also oval.

According to a further illustrative embodiment the carrier body is tubular at least in the region of the support surface. The carrier body for example consists (at least substantially) of steel or high-alloy steel (i.e. for example a steel in which the average mass content of at least one alloy element is ≥5%) or of a tube made of steel or high-alloy steel. According to a further illustrative embodiment the diameter of the hollow cross section of the carrier body or the internal tube diameter, at least in the region of the support surface, is no less than 0.5 mm and/or no greater than 1 mm. According to a further illustrative embodiment the external diameter of the carrier body or the external tube diameter, at least in the region of the support surface, is no less than 2 mm and/or no greater than 4 mm, for example no greater than 3 mm. According to a further illustrative embodiment the radius of curvature of the support surface orthogonally to the flow direction of the coolant is no less than 1 mm and/or no greater than 2 mm, for example no greater than 1.5 mm. According to a further illustrative embodiment the ratio of the diameter of the hollow cross section of the carrier body, at least in the region of the support surface, to the external diameter of the carrier body, at least in the region of the support surface, is no less than ¼ and/or no greater than ½. According to a further illustrative embodiment the carrier body is uncoated at least in the region of the support surface. According to a further illustrative embodiment coolant flows through the carrier body in accordance with the counterflow principle. According to a further illustrative embodiment the coolant is additionally and/or actively heated. According to a further illustrative embodiment the carrier body comprises at least two flow channels for the coolant flowing therethrough, which each only extend over a section of the annular support surface, wherein it is for example provided that two flow channels are connected in a region in which they leave the support surface by means of metal filler material, for example solder.

The method described may also be carried out in connection with pressing under vacuum or near vacuum or at least under negative pressure. Within the meaning of this disclosure, negative pressure is for example a pressure that is no greater than 0.5 bar, for example no greater than 0.3 bar, for example no less than 0.1 bar, for example no less than 0.2 bar. Within the meaning of this disclosure, vacuum or near vacuum is for example a pressure that is no greater than 0.1 bar, for example no greater than 0.01 bar, for example no greater than 0.001 bar. Within the meaning of this disclosure, vacuum or near vacuum is for example a pressure that is no less than 0.01 bar, for example no less than 0.001 bar, for example no less than 0.0001 bar. Suitable methods are for example disclosed in JP 2003-048728 A (incorporated by reference in its entirety), in which pressing is carried out in an evacuated (vacuum, near vacuum, negative pressure) chamber, and in WO 2014/131426 A1 (incorporated by reference in its entirety). In a corresponding configuration, a bellows may be provided, as disclosed in WO 2014/131426 A1, at least in a similar manner.

According to a further illustrative embodiment it is provided that, after press-molding, the optical element is placed on a transport element and passes through a cooling path on the transport element without an optical surface of the optical element being contacted. Within the meaning of the disclosure, a cooling path (for example for cooling optical elements) is for example used for the controlled cooling of the optical element (for example with the addition of heat). Exemplary cooling regimes may e.g. be found in "Werkstoffkunde Glas" [Glass Materials Science], 1st edition, VEB Deutscher Verlag für Grundstoffindustrie, Leipzig VLN 152-915/55/75, LSV 3014, editorial deadline: Jan. 9, 1974, order number: 54107, e.g. page 130 and "Glastechnik—BG 1/1—Werkstoff Glas" [Glass Technology—vol. 1/1—Glass: The Material], VEB Deutscher Verlag für Grundstoffindustrie, Leipzig 1972, e.g. page 61 ff (incorporated by reference in its entirety).

Within the meaning of the disclosure, a blank is for example a portioned glass part or a blank or a preform.

Within the meaning of this disclosure, a headlight lens may e.g. be a headlight lens as described in WO 2017/059945 A1, WO 2014/114309 A1, WO 2014/114308 A1, WO 2014/114307 A1, WO 2014/072003 A1, WO 2013/178311 A1, WO 2013/170923 A1, WO 2013/159847 A1, WO 2013/123954 A1, WO 2013/135259 A1, WO 2013/068063 A1, WO 2013/068053 A1, WO 2012/130352 A1, WO 2012/072187 A2, WO 2012/072188 A1, WO 2012/072189 A2, WO 2012/072190 A2, WO 2012/072191 A2, WO 2012/072192 A1, WO 2012/072193 A2, or PCT/EP2017/000444, for example. Each of these documents is incorporated by reference in its entirety.

Within the meaning of this disclosure, press-molding is for example understood to mean pressing an (for example optically active) surface such that subsequent finishing of the contour of this (for example optically active) surface is or can be omitted or is not provided. It is thus for example provided that a press-molded surface is not polished after the press-molding. Polishing, which influences the surface finish but not the contours of the surface, may be provided in some cases. Press-molding on both sides can for example be understood to mean that an (for example optically active) light exit surface is press-molded and an (for example optically active) light entry surface that is for example opposite the (for example optically active) light exit surface is likewise press-molded.

Within the meaning of this disclosure, an optically active surface is for example a surface (of a transparent body) on which light refraction takes place when (the headlight lens is) used as intended. Within the meaning of this disclosure, an optically active surface is for example a surface on which the direction of light passing through this surface is changed (in a targeted manner) when the headlight lens is used as intended.

Within the meaning of this disclosure, a recess for example includes a bearing that couples or connects the recess to the corresponding guide rod. Within the meaning of this disclosure, a recess may be widened to form a sleeve or may be designed as a sleeve. Within the meaning of this disclosure, a recess may be widened to form a sleeve comprising an inner bearing or may be designed as a sleeve comprising an inner bearing.

Within the meaning of the disclosure, glass is for example inorganic glass. Within the meaning of the disclosure, glass is for example silicate glass. Within the meaning of the disclosure, glass is for example glass as described in WO 2009/109209 A1. Within the meaning of the disclosure, glass for example contains 0.2 to 2 wt. % $Al_2O_3$,
0.1 to 1 wt. % $Li_2O$,
0.3, for example 0.4, to 1.5 wt. % $Sb_2O_3$,
60 to 75 wt. % $SiO_2$,
3 to 12 wt. % $Na_2O$,
3 to 12 wt. % $K_2O$ and
3 to 12 wt. % CaO,
such as DOCTAN®.

In addition to particular contour accuracy and precise optical properties being required, the desire has developed for molding headlight lenses from borosilicate glass or glass systems similar to borosilicate glass, in order to obtain increased weather resistance and/or hydrolytic resistance (chemical resistance). Standards or evaluations methods for hydrolytic resistance (chemical resistance) are the Hella N67057 standard test and the climatic test/humidity-frost test, for example. High hydrolytic resistance is also classified as type 1, for example. In the light of the requirement for borosilicate-glass headlight lenses having corresponding hydrolytic resistance, the problem is posed of pressing headlight lenses from borosilicate glass or similar glass systems having the same hydrolytic resistance (chemical resistance). In a departure from this problem, an alternative method for producing an optical element or headlight lens is proposed, wherein a blank made of non-borosilicate glass and/or soda-lime glass (soda lime silica glass) is heated and/or provided and, after being heated and/or provided, is press-molded, for example on both sides, between a first mold, for example for molding and/or press-molding a first optically active surface of the optical element, and at least one second mold, for example for molding and/or press-molding a second optically active surface of the optical element, to form the optical element, wherein the first optically active surface and/or the second optically active surface is sprayed with a surface-treatment agent (after the press-molding). Within the meaning of this disclosure, spraying for example includes atomizing, misting and/or (the use of) spray mist. Within the meaning of this disclosure, spraying for example means atomizing, misting and/or (the use of) spray mist.

Within the meaning of this disclosure, soda-lime glass for example contains
  60 to 75 wt. % $SiO_2$ and
  3 to 12 wt. % CaO,
  or
  70 to 75 wt. % $SiO_2$ and
  3 to 12 wt. % CaO.

Within the meaning of this disclosure, soda-lime glass for example contains
  60 to 75 wt. % $SiO_2$,
  3 to 12 wt. % $K_2O$ and
  3 to 12 wt. % CaO,
  or
  70 to 75 wt. % $SiO_2$,
  3 to 12 wt. % $K_2O$ and
  3 to 12 wt. % CaO.

Within the meaning of this disclosure, soda-lime glass for example contains
  60 to 75 wt. % $SiO_2$,
  3 to 12 wt. % $Na_2O$,
  3 to 12 wt. % $K_2O$ and
  3 to 12 wt. % CaO,
  or
  70 to 75 wt. % $SiO_2$,
  3 to 12 wt. % $Na_2O$,
  3 to 12 wt. % $K_2O$ and
  3 to 12 wt. % CaO.

Within the meaning of this disclosure, soda-lime glass for example contains
  0.2 to 2 wt. % $Al_2O_3$,
  60 to 75 wt. % $SiO_2$,
  3 to 12 wt. % $Na_2O$,
  3 to 12 wt. % $K_2O$ and
  3 to 12 wt. % CaO.

Within the meaning of this disclosure, soda-lime glass for example contains
  0.2 to 2 wt. % $Al_2O_3$,
  0.1 to 1 wt. % $Li_2O$,
  60 to 75 wt. % $SiO_2$,
  3 to 12 wt. % $Na_2O$,
  3 to 12 wt. % $K_2O$ and
  3 to 12 wt. % CaO,
  or
  0.2 to 2 wt. % $Al_2O_3$,
  0.1 to 1 wt. % $Li_2O$,
  70 to 75 wt. % $SiO_2$,
  3 to 12 wt. % $Na_2O$,
  3 to 12 wt. % $K_2O$ and
  3 to 12 wt. % CaO.

Within the meaning of this disclosure, soda-lime glass for example contains
  0.2 to 2 wt. % $Al_2O_3$,
  0.1 to 1 wt. % $Li_2O$,
  0.3, for example 0.4, to 1.5 wt. % $Sb_2O_3$,
  60 to 75 wt. % $SiO_2$,
  3 to 12 wt. % $Na_2O$,
  3 to 12 wt. % $K_2O$ and
  3 to 12 wt. % CaO,
  such as DOCTAN®, or
  0.2 to 2 wt. % $Al_2O_3$,
  0.1 to 1 wt. % $Li_2O$,
  0.3, for example 0.4, to 1.5 wt. % $Sb_2O_3$,
  70 to 75 wt. % $SiO_2$,
  3 to 12 wt. % $Na_2O$,
  3 to 12 wt. % $K_2O$ and
  3 to 12 wt. % CaO.

The surface-treatment agent for example contains $AlCl_3*6H_2O$ (dissolved in a solvent and/or $H_2O$), wherein suitable mixture ratios can be found in DE 103 19 708 A1 (e.g. FIG. 1). For example, at least 0.5 g, for example at least 1 g, $AlCl_3*6H_2O$ is provided per liter $H_2O$.

According to a further illustrative embodiment the surface-treatment agent in the form of a spray agent is sprayed onto the optically active surface, wherein the surface-treatment agent forms droplets, of which the size and/or the average size and/or the diameter and/or the average diameter is no greater than 50 µm.

According to a further illustrative embodiment the surface-treatment agent in the form of a spray agent is sprayed onto the optically active surface, wherein the surface-treatment agent forms droplets, of which the size and/or the average size and/or the diameter and/or the average diameter is no less than 10 µm.

According to a further illustrative embodiment the surface-treatment agent is sprayed so as to be mixed with compressed air. disclosure According to an illustrative embodiment compressed air, for example in combination with a mixing nozzle or dual-substance nozzle, is used for generating a spray mist for the surface-treatment agent.

According to a further illustrative embodiment the optically active surface is sprayed with the surface-treatment agent before the optical element is cooled in an annealing line for cooling in accordance with a cooling regime.

According to a further illustrative embodiment an optically active surface is sprayed with the surface-treatment agent for no longer than 4 seconds. Here, an optically active surface is sprayed with the surface-treatment agent for example for no longer than 12 seconds, for example for no longer than 8 seconds, for example for no less than 2 seconds. In this process, the optically active surface is for example sprayed until it has been sprayed with no less than 0.05 ml surface-treatment agent and/or with no more than 0.5 ml, for example 0.2 ml, surface-treatment agent.

It is for example provided that, after being sprayed with surface-treatment agent, the headlight lens or a headlight lens according to the disclosure consists of at least 90%, for example at least 95%, for example (substantially) 100%, quartz glass on the surface. It is for example provided that the following is applicable in relation to the oxygen bonding to silicon on the surface of the headlight lens or the optical element $$\frac{Q(4)}{Q(4)+Q(3)} \geq 0.9$$

for example $$\frac{Q(4)}{Q(4)+Q(3)} \geq 0.95$$

In the above, Q(3) and Q(4) denote the crosslinking of the oxygen ions with the silicon ion, wherein 3 oxygen ions (Q(3)) or 4 oxygen ions (Q(4)) are arranged at the tetrahedron corners of the silicon ion. The proportion of quartz glass decreases towards the interior of the headlight lens or optical element, wherein, at a depth (distance from the surface) of 5 µm, it is for example provided that the proportion of quartz glass is at least 10%, for example at least 5%. It is for example provided that the following is applicable in relation to the oxygen bonding to silicon of the headlight lens or the optical element at a depth of 5 µm $$\frac{Q(4)}{Q(4)+Q(3)} \geq 0.1$$

for example $$\frac{Q(4)}{Q(4)+Q(3)} \geq 0.05$$

It is for example provided that the proportion of quartz glass at a depth (distance from the surface) of 5 µm is no greater than 50%, for example no greater than 25%. It is for example provided that the following is applicable in relation to the oxygen bonding to silicon of the headlight lens or the optical element at a depth of 5 µm $$\frac{Q(4)}{Q(4)+Q(3)} \leq 0,5$$

for example $$\frac{Q(4)}{Q(4)+Q(3)} \leq 0.25$$

According to a further illustrative embodiment it is provided that, after press-molding, the optical element is placed on a transport element, is sprayed with surface-treatment agent on the transport element and, thereafter or subsequently, passes through a or the cooling path on the transport element without an optical surface of the optical element being contacted (see above). It is necessary to comply with a cooling regime of this kind in order to prevent any internal stresses within the optical element or the headlight lens, which, although they are not visible upon visual inspection, can sometimes significantly impair the lighting properties as an optical element of a headlight lens. These impairments result in a corresponding optical element or headlight lens becoming unusable. It has surprisingly been found that, although the claimed spraying of the hot optical element or headlight lens after press-molding or after removal from the mold following the press-molding changes the cooling regime, the resulting optical stresses are negligible. It is also surprising that a corresponding headlight lens ranges between the above-mentioned optical tolerances in relation to its optical property, although the refractive index is reduced by the proportion of quartz glass on the surface.

According to a further illustrative embodiment the transport element is heated, for example inductively, before receiving the optical element. According to a further illustrative embodiment the transport element is heated at a heating rate of at least 20 K/s, for example of at least 30 K/s. According to a further illustrative embodiment the transport element is heated at a heating rate of no greater than 50 K/s. According to a further illustrative embodiment the transport element is heated by means of an energized winding/coil which is arranged above the transport element.

According to a further illustrative embodiment the blank is produced, cast and/or molded from molten glass. According to a further illustrative embodiment the mass of the blank is 10 g to 400 g, for example 20 g to 250 g.

It is for example provided that, before reversing the temperature gradient, the blank is removed from a mold for molding or producing the blank. It is for example provided that the temperature gradient is reversed outside a mold. Within the meaning of the disclosure, cooling with the addition of heat for example means that cooling is carried out a temperature of greater than 100° C.

According to an illustrative embodiment a or the right-hand side surface of the light tunnel and/or a or the left-hand side surface of the light tunnel is curved so as to be concave (at least in part).

Within the meaning of the disclosure, a side surface of the light tunnel is for example a surface delimiting the light tunnel laterally.

According to a further illustrative embodiment the light tunnel is funnel-shaped, wherein it tapers towards the light entry surface. According to a further illustrative embodiment the right-hand and the left-hand side of the light tunnel form a part of a funnel, which tapers towards the light entry surface. In one configuration of the disclosure, the left-hand side surface of the light tunnel is not symmetrical to the right-hand side surface of the light tunnel. In one configuration of the disclosure, the left-hand side surface of the light tunnel is inclined relative to the optical axis of the light tunnel. In one configuration of the disclosure, the right-hand side surface of the light tunnel is inclined relative to the optical axis of the light tunnel.

Within the meaning of this disclosure, a light tunnel is for example characterized in that substantially total reflection takes place on its lateral (for example upper, lower, right and/or left) surfaces, such that light entering through the light entry surface is guided through the tunnel in the form of an optical waveguide. Within the meaning of this disclosure, a light tunnel is for example an optical waveguide. It is for example provided that the total reflection takes place on the longitudinal surfaces of the light tunnel. It is for example provided that the longitudinal surfaces of the light tunnel are provided for the total reflection. It is for example provided that the total reflection takes place on the surfaces of the light tunnel oriented substantially in the direction of the optical axis of the light tunnel. It is for example provided that the surfaces of the light tunnel oriented substantially in the direction of the optical axis of the light tunnel are provided for the total reflection. According to an illustrative embodiment it is provided that the light tunnel, for example in the region of the bend, does not comprise a reflective coating.

Within the meaning of this disclosure, a bend is for example a curved transition. Within the meaning of this disclosure, a bend is for example a curved transition having a radius of curvature of no less than 50 nm. It is for example provided that the surface of the headlight lens does not have a discontinuity in the bend, but instead has a curvature. It is for example provided that the surface of the headlight lens has a curvature in the bend, for example having a radius of the curvature in the bend of no less than 50 nm. According to an illustrative embodiment the radius of curvature is no greater than 5 mm. According to an illustrative embodiment the radius of curvature is no greater than 0.25 mm, for example no greater than 0.15 mm, for example no greater than 0.1 mm. According to a further illustrative embodiment the radius of the curvature in the bend is at least 0.05 mm. It is for example provided that the surface of the headlight lens is press-molded in the bend region.

In one configuration of the disclosure, the orthogonal of the light entry surface is inclined relative to the optical axis of the light-passage section, for example at an angle of between 85 degree and 20 degree, for example at an angle of between 70 degree and 40 degree.

According to a further illustrative embodiment the length of the headlight lens in the orientation of the optical axis of the light tunnel and/or light-passage section is no greater than 9 cm.

It may be provided that a light entry surface within the meaning of this disclosure and/or a light exit surface within the meaning of this disclosure comprises a light-scattering structure. Within the meaning of the disclosure, a light-scattering structure may e.g. be a structure as disclosed in DE 10 2005 009 556 A1 and EP 1 514 148 A1 or EP 1 514 148 B1. Within the meaning of this disclosure, it may be provided that a light tunnel is coated. Within the meaning of this disclosure, it may be provided that a light tunnel is coated with a reflective layer.

The above-mentioned problem is also solved by a method for producing a vehicle headlight, for example a motor-vehicle headlight, wherein the vehicle headlight comprises a headlight lens, for example comprising one or more of the above-mentioned features, as well as a light source for coupling light into the light entry surface, which are oriented relative to one another and/or are integrated together in a housing. According to an illustrative embodiment the light source comprises at least one LED or an assembly of LEDs. According to an illustrative embodiment the light source comprises at least one OLED or an assembly of OLEDs. The light source may for example also be a planar light-emitting field. The light source may also comprise light-emitting element chips, as disclosed in DE 103 15 131 A1. A light source may also be a laser. A laser that can be used is disclosed in ISAL 2011 Proceedings, page 271 ff.

It may be provided that the motor-vehicle headlight implements low-beam light in conjunction with at least one additional (in this paragraph, "additional" is synonymous with "second" or "at least second") motor-vehicle headlight. In this case, the additional motor-vehicle headlight comprises an additional headlight lens comprising an additional, for example press-molded, for example integral, body made of a transparent material, wherein the for example integral body comprises at least one additional light tunnel and one additional light-passage section having at least one additional optically active light exit surface, wherein the additional light tunnel comprises at least one, optionally optically active, additional light entry surface and, with an additional bend, transitions into the additional light-passage section in order to image the additional bend as a bright-dark-boundary by means of light coupled or directed into the additional light entry surface. The additional motor-vehicle headlight also comprises an additional light source, for example an LED, for coupling or directing light into the additional light entry surface.

According to a further illustrative embodiment the vehicle headlight does not comprise secondary optics assigned to the headlight lens. Within the meaning of the disclosure, secondary optics are for example optics for orienting light which exits from the light exit surface or the last light exit surface of the headlight lens. Within the meaning of the disclosure, secondary optics are for example an optical element for orienting light arranged downstream of and/or separated from the headlight lens. Within the meaning of the disclosure, secondary optics are for example not a cover panel or protective panel, but instead are an optical element provided for orienting light. One example of secondary optics is, for example, a secondary lens, as disclosed in DE 10 2004 043 706 A1.

According to a further illustrative embodiment the distance between the light source and the midpoint of the light exit surface in the orientation of the optical axis of the light tunnel and/or light-passage section is no greater than 12 cm. According to a further illustrative embodiment the length of the vehicle headlight (limited to the light source and headlight lens) in the orientation of the optical axis of the light tunnel and/or light-passage section is no greater than 12 cm.

One or more light sources may be provided, of which the light is coupled or directed into the light-passage section and/or a part of the light tunnel for implementing sign light, high beam and/or cornering light. When coupling additional light of this kind into the light tunnel, it is for example provided that this takes place in the half of the light tunnel which is closer to the light-passage section and/or in which the light entry surface is not provided.

One or more light sources may be provided, of which the light is coupled or directed into the light-passage section and/or a part of the light tunnel for implementing sign light, high beam and/or cornering light. When coupling additional light of this kind into the light tunnel, it is for example provided that this takes place in the half of the light tunnel which is closer to the light-passage section and/or in which the light entry surface is not provided. Additional light-source assemblies may for example be provided, as described or claimed in WO 2012/072192 A1. In this case, additional light-source assemblies are for example described in FIGS. 10, 14, 15, 18, 19, 20 and 21 of WO 2012/072192 A1. The headlight lens according to the disclosure may for example also be used in arrays having optical axes that are inclined relative to one another, as disclosed (or claimed) in WO 2012/072193 A2, for example, for example in FIG. 25 of WO 2012/072193 A2. Additionally or alternatively, it may be provided that the headlight lens according to the disclosure is used in vehicle configurations as disclosed or claimed in WO 2012/072191 A2.

According to an illustrative embodiment it is provided that the RMSt value (total surface form deviation) according to DIN ISO 10110-5 of April 2016 for the optically active surfaces (such as the light exit surface of the light-passage section and/or the light entry surface of the light tunnel) of the optical element, for at least one optically active surface of the optical element and/or for at least two optically active surfaces of the optical element, is no greater than 12 µm, for example no greater than 10 µm, for example no greater than 8 µm, for example no greater than 6 µm, for example no greater than 4 µm, for example no greater than 2 µm, for example no less than 0.5 µm.

Within the meaning of the disclosure, a motor vehicle is for example a land vehicle that can be used individually in road traffic. Within the meaning of the disclosure, motor vehicles are for example not limited to land vehicles comprising internal combustion engines.

Figure 2:
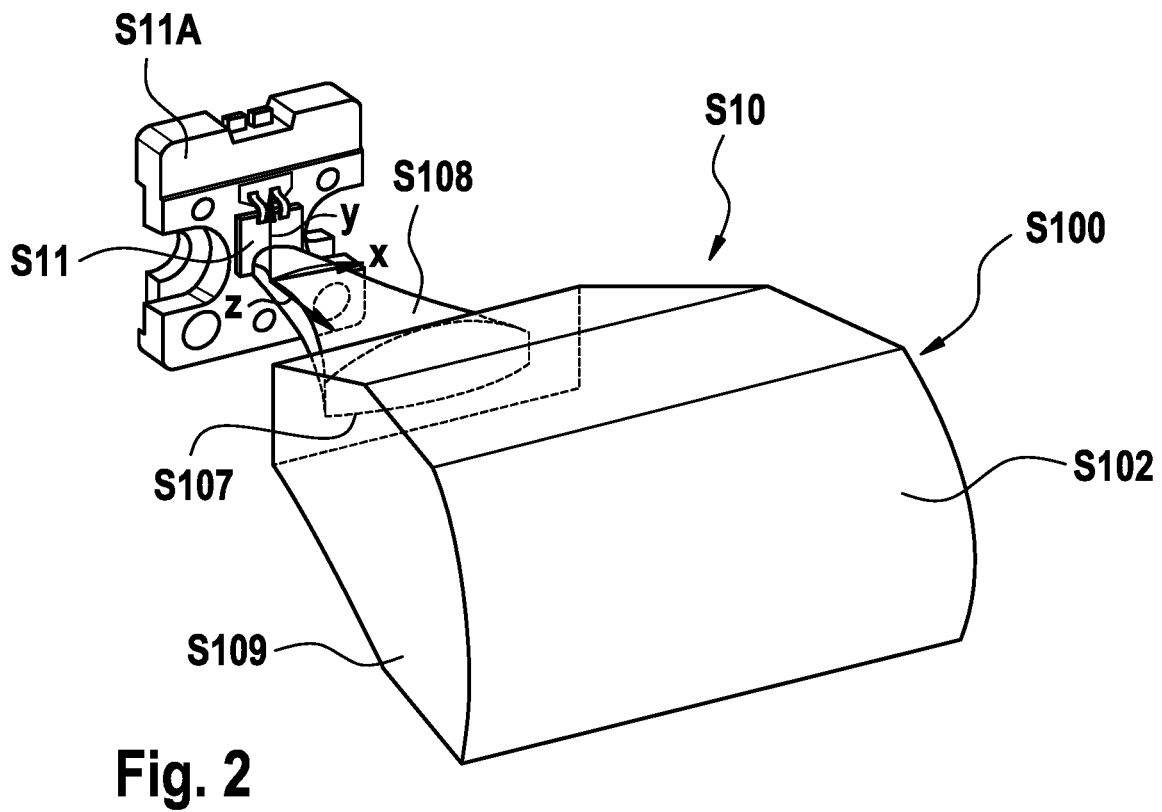
FIG. 2 is a perspective front view of an embodiment of an additional motor-vehicle headlight for use in the motor vehicle according to FIG. 1.
Figure 3:
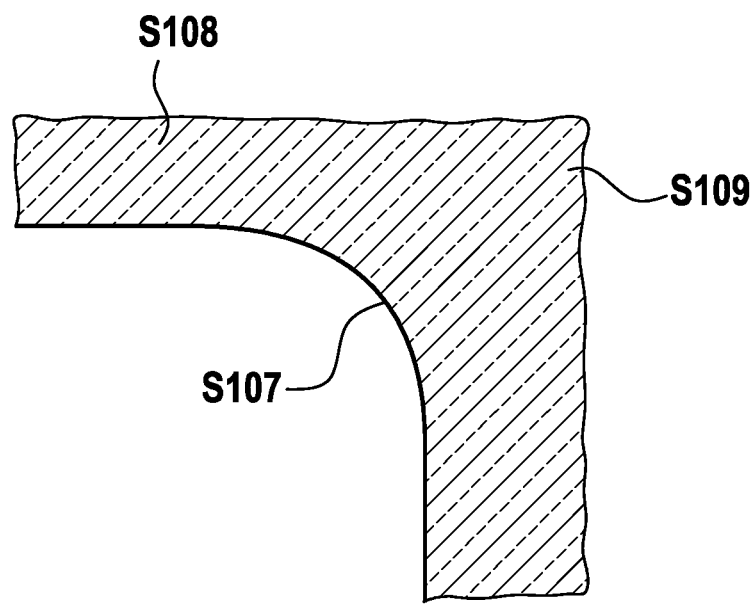
FIG. 3 is an enlarged view of the transition between the light tunnel and the light-passage section of the headlight lens according to FIG. 2.

FIG. 1 shows an embodiment of a motor vehicle S1 comprising a motor-vehicle headlight S10. FIG. 2 is a plan view of the motor-vehicle headlight S10 comprising a headlight lens S100, but without a housing, retainers or a power supply. The headlight lens S100 comprises a press-molded, integral body made of inorganic glass, which comprises a light tunnel S108, which has a light entry surface on one side and, on the other side, transitions into a light-passage section S109 having a light exit surface S102 with a bend S107 that is configured as a curved transition and is shown as being enlarged in FIG. 3. The motor-vehicle headlight S10 also comprises a light source S11 arranged on a carrier S11A for directing light into the light entry surface of the light tunnel S108. Details of this headlight lens S100 can also be found in WO 2017/207079 A1.

Figure 4:
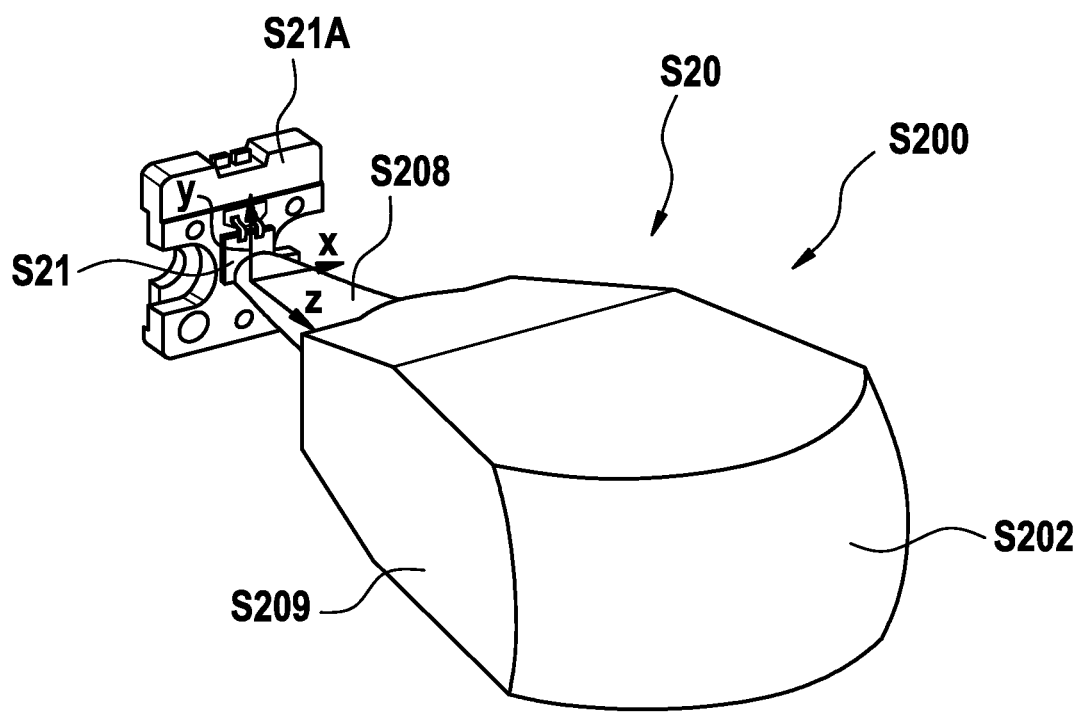
FIG. 4 is a perspective front view of an embodiment of an additional motor-vehicle headlight for use in the motor vehicle according to FIG. 1.
Figure 5:
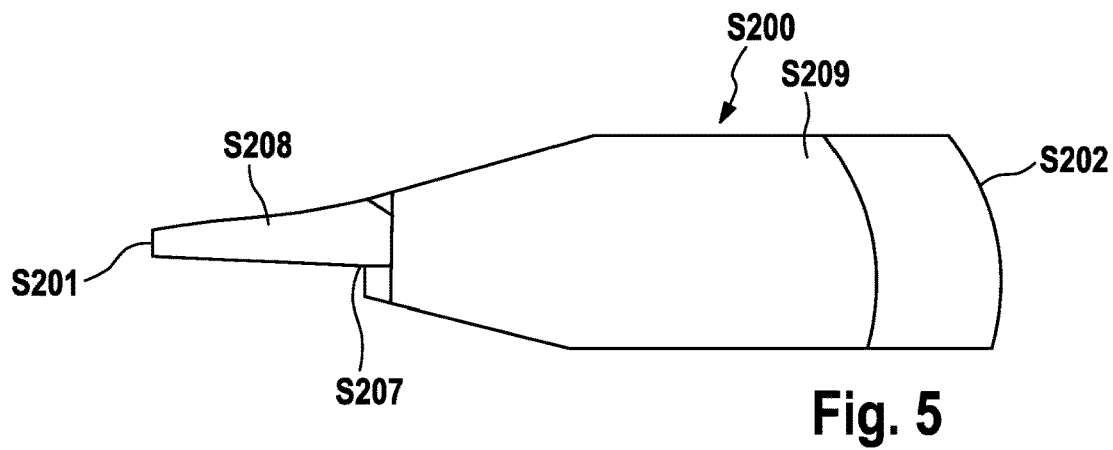
FIG. 5 is a side view of a headlight lens according to FIG. 4.

FIG. 4 is a perspective front view of an embodiment of a motor-vehicle headlight S20 comprising a headlight lens S200, shown in a side view in FIG. 5, but without a housing, retainers or a power supply. The headlight lens S200 comprises a (press-molded) integral body made of inorganic glass, for example glass that contains 0.2 to 2 wt. % $Al_2O_3$,
0.1 to 1 wt. % $Li_2O$,
0.3, for example 0.4, to 1.5 wt. % $Sb_2O_3$,
60 to 75 wt. % $SiO_2$,
3 to 12 wt. % $Na_2O$,
3 to 12 wt. % $K_2O$ and
3 to 12 wt. % CaO.

The (press-molded) integral body comprises a light tunnel S208, which has a light entry surface S201 on one side and, on the other side, transitions into a light-passage section S209 (of the integral body) comprising a light exit surface S202 with a bend S207, similar to the bend S107, that is configured as a curved transition, wherein z is a coordinate in the direction of the optical axis of the light tunnel S108 or S208 and/or in the longitudinal direction of the light tunnel S108 or S208 and/or the optical axis of the headlight lens S100 or S200 and/or the light-passage section S109 or S209 and/or the optical axis of the light exit surface S102 or S202, y is a coordinate in the vertical direction and/or a rotational axis, and x is a coordinate orthogonal to the y direction and orthogonal to the z direction and/or in the horizontal direction.

Figure 7:
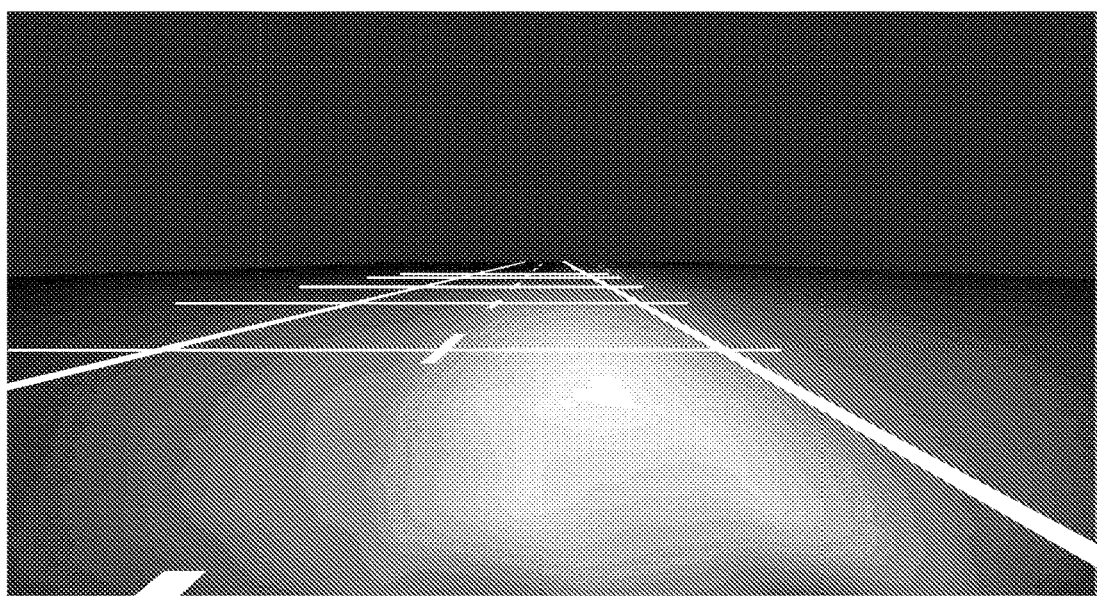
FIG. 7 shows the superimposed illumination of a carriageway by means of a motor-vehicle headlight as a combination of the motor-vehicle headlight according to FIG. 2 and the motor-vehicle headlight according to FIG. 4.

The headlight lens S200 is for example configured such that light which enters the headlight lens S200 through the light entry surface S201 and enters the light-passage section S209 in the region of the bend S207 of the light tunnel S208 exits from the light exit surface S202 substantially in parallel with the optical axis of the headlight lens S200. The bend S207 is (molded by press-molding and is) configured as a (continuously) curved transition. The light-passage section S209 images the bend S207 as a bright-dark-boundary, wherein light is radiated or coupled into the light entry surface S201 of the light tunnel S208 by means of a light source S21 configured as an LED and arranged on a carrier S21A for implementing low-beam light or for partially implementing low-beam light. In the present embodiment, it is provided that the motor-vehicle headlight S10 and the motor-vehicle headlight S20 complement one another to form low-beam light. This means that the motor-vehicle headlight S10 and the motor-vehicle headlight S20 together form a motor-vehicle headlight for implementing low-beam light for projecting a bright-dark-boundary shown in FIG. 7 onto a carriageway.

Figure 6:
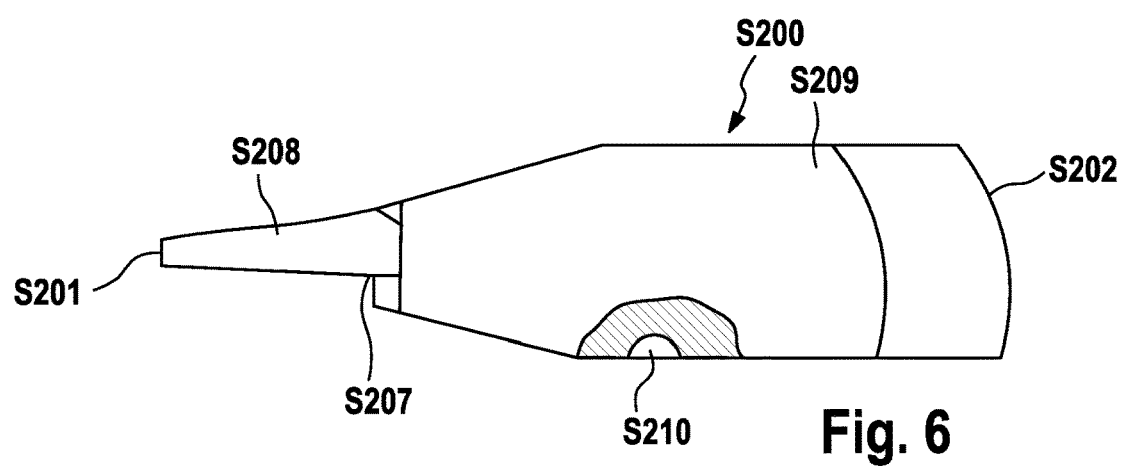
FIG. 6 is a partially cross-sectional side view of the headlight lens according to FIG. 5.

FIG. 6 is a partially cross-sectional side view of the headlight lens S200 in an optional configuration. In this figure, the headlight lens S200 comprises an orienting element S210 for orienting the headlight lens in the form of an indentation. In the present configuration of the headlight lens S200, a total of four indentations S210 of this type are provided.

Figure 8:
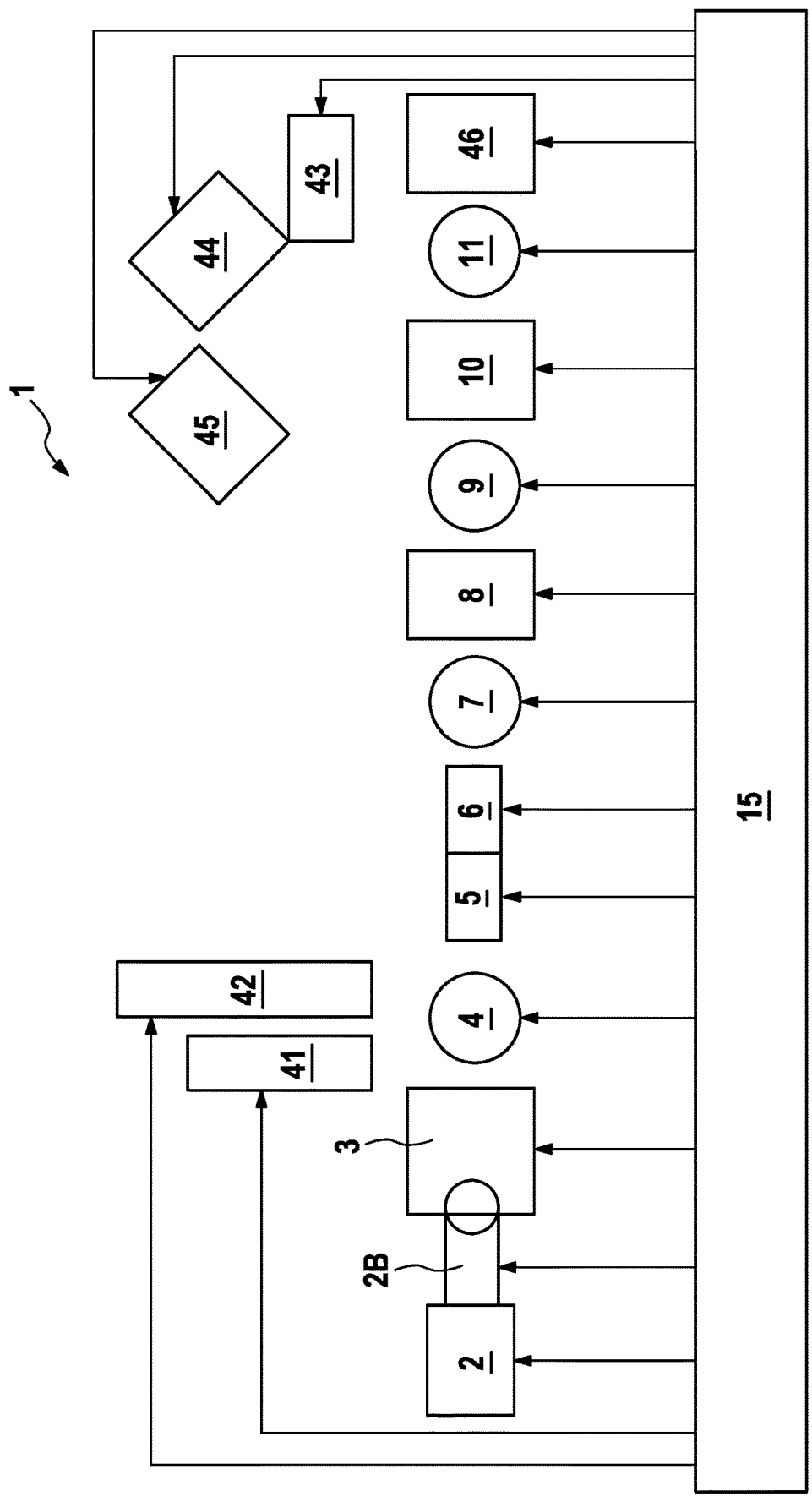
FIG. 8 is a schematic view of a device for producing motor-vehicle headlight lenses or lens-like free-forms for motor-vehicle headlights or optical elements made of glass.

FIG. 8 is a schematic view of a device 1 for producing headlight lens such as the headlight lens S200. A corresponding method for producing headlight lenses is disclosed in FIGS. 10 and 11. The device 1 for producing optical elements such as the headlight lens 202 comprises a melting unit 2, such as a trough, in which soda-lime glass, in the present embodiment DOCTAN®, is melted in a process step 120.

The melting unit 2 may e.g. comprise an adjustable outlet 2B. In a process step 121, liquid glass is brought from the melting unit 2 into a preform device 3 for producing a blank, such as a gob, for example having a mass of from 10 g to 400 g, for example of from 50 g to 250 g, or a blank that is close to the final contours (a blank that is close to the final contours has a contour that is similar to the contour of the motor-vehicle headlight lens to be pressed or to the lens-like free-form for motor-vehicle headlights). This may e.g. comprise molds in which a defined quantity of glass is cast. The blank is produced in a process step 122 by means of the preform device 3.

The process step 122 is followed by a process step 123, in which the blank is transferred to a cooling apparatus 5 by means of a transfer station 4 and is cooled by means of the cooling apparatus 5 e.g. at a temperature of between 300° C. and 500° C., for example of between 350° C. and 450° C. It is for example provided that the blank is cooled such that the temperature of the blank is above Tg, for example such that the temperature of the blank is no less than 600° C. In a subsequent process step 124, the blank is heated by means of a heating apparatus 6 at a temperature of between 700° C. and 1600° C., for example of between 1000° C. and 1250° C., wherein it is for example provided that the blank is heated such that the viscosities mentioned at the outset are set or are produced. A combination of the cooling apparatus 5 with the heating apparatus 6 is an example of a temperature-control apparatus for setting a temperature gradient.

Figure 16:
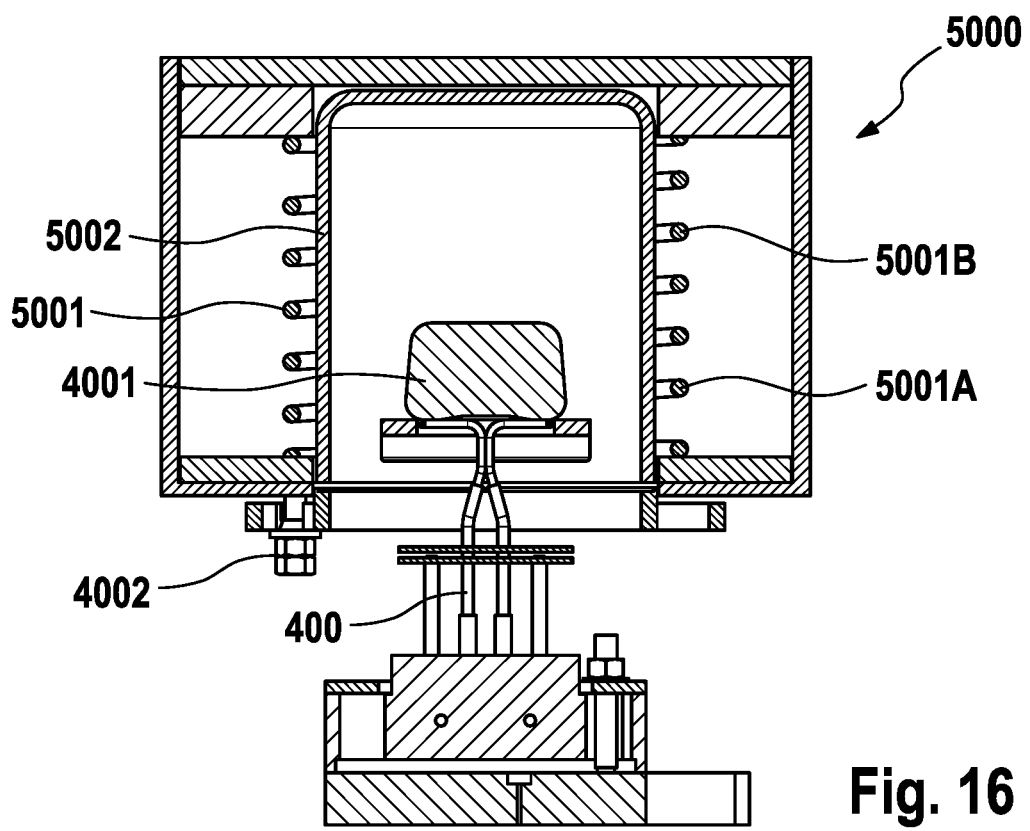
FIG. 16 shows a lance according to FIG. 12 in a hood-type annealing furnace comprising a protective cover for heating a gob.
Figure 17:
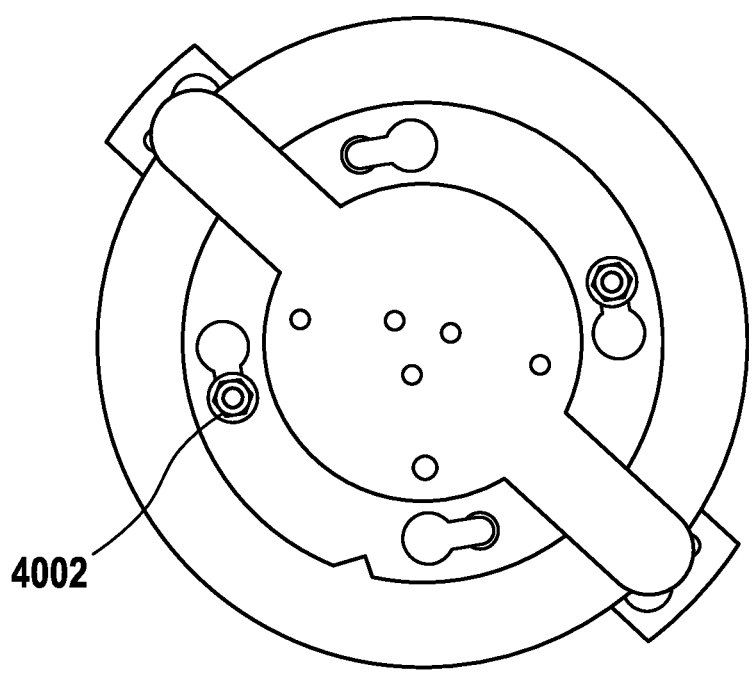
FIG. 17 is a view of the hood-type annealing furnace according to FIG. 16 from below.
Figure 18:
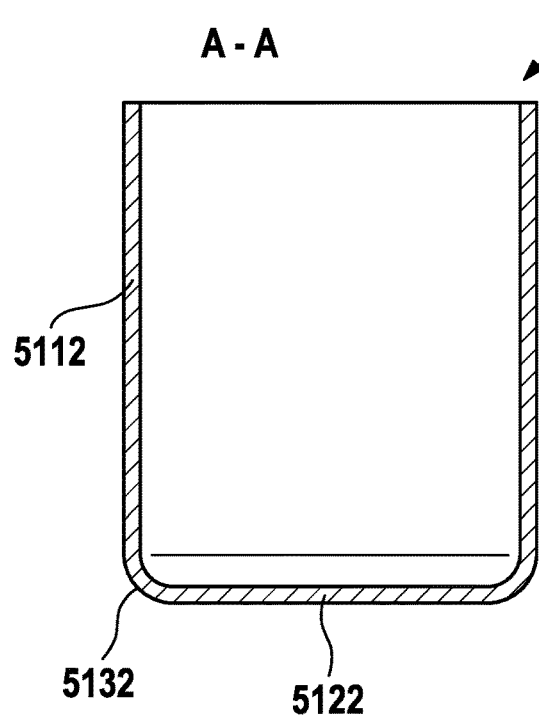
FIG. 18 is a cross section through the protective cover according to FIG. 16.
Figure 19:
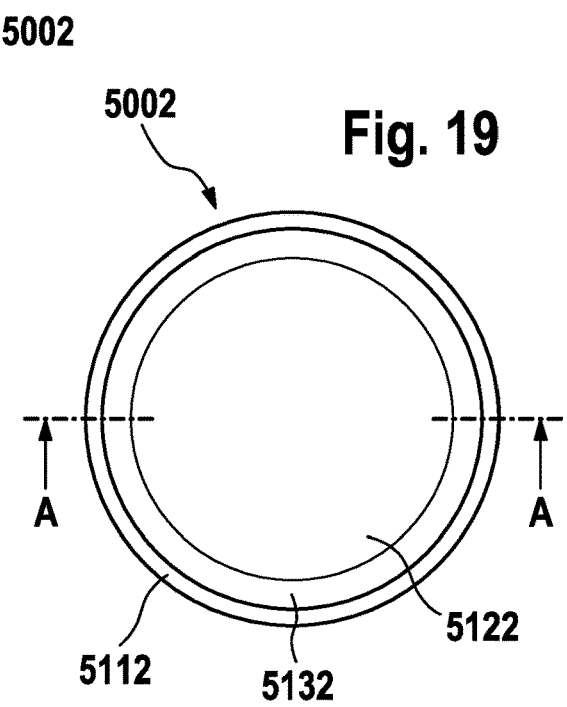
FIG. 19 is a view into the interior of the protective cover according to FIG. 16.
Figure 20:
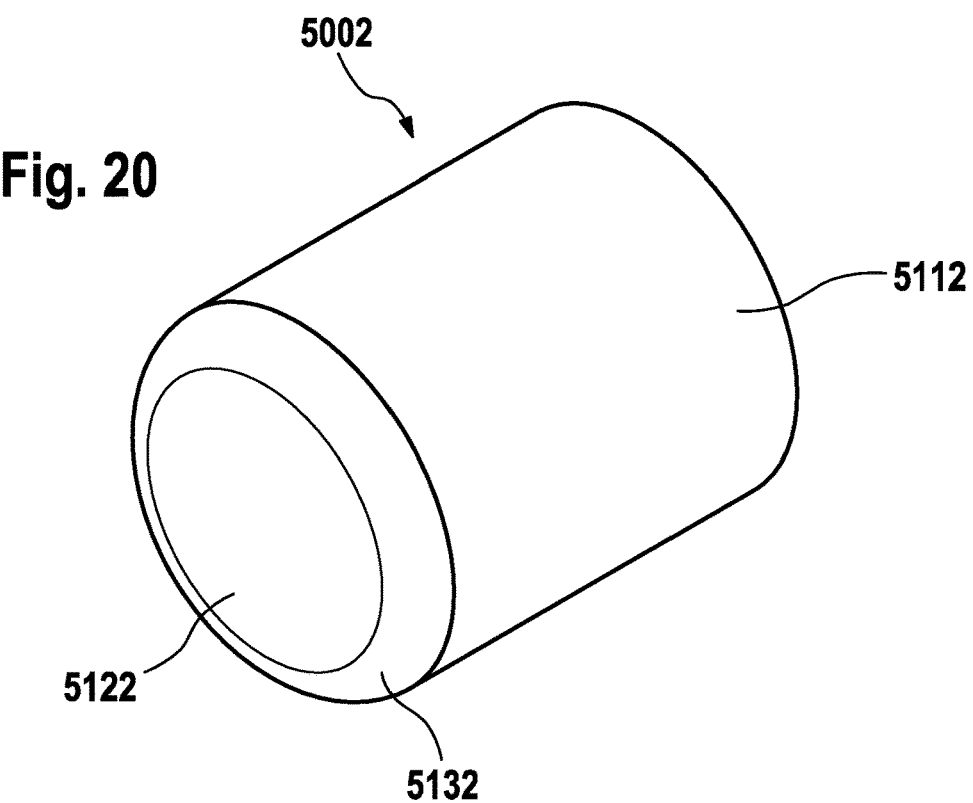
FIG. 20 is a perspective view of the protective cover according to FIG. 16.

In a preferred configuration, this temperature-control apparatus and/or the combination of the heating apparatuses 5 and 6 is designed as a hood-type annealing furnace 5000, as shown in FIG. 16. FIG. 16 shows a gob 4001 to be heated on a support device 400 designed as a lance. Heating coils 5001 are provided for heating the gob 4001. In order to protect these heating coils 5001 against a defective gob bursting open, the interior of the hood-type annealing furnace 5000 is lined with a protective cover 5002. FIG. 17 is a view of the hood-type annealing furnace 5000 according to FIG. 16 from below, FIG. 18 is a cross section through the protective cover 5002 according to FIG. 16, FIG. 19 is a view into the interior of the protective cover 5002 according to FIG. 16, and FIG. 20 is a perspective view of the protective cover 5002. In the embodiment according to FIG. 16, this protective cover 5002 is configured to be cup-shaped. In this configuration, the protective cover 5002 comprises a cylindrical region 5112, which transitions into a covering region 5122 via a rounded region 5132.

The radius of curvature of the curved region 5132 is between 5 mm and 20 mm, for example. In the embodiment according to FIG. 18, the radius of curvature of the curved region 5132 is approximately 10 mm. The protective cover 5002 is secured in the hood-type annealing furnace 5000 and is fixed by a nut 4002. In another preferred configuration, a bayonet catch is provided, by means of which a protective cover can be changed more rapidly.

The protective cover 5002 for example has the purpose of protecting the heating coils 5001 positioned in the furnace against glass bursting open. If a gob bursts open in the furnace without this protective cover, some of the glass or the majority of the glass clings to the heating coils 5001 and thus impairs the heating process for the next gob or even destroys the heating coils 5001 and thus destroys the entire functional capability of the furnace. The protective covers 5002, 5202, 5302 are removed after a gob has burst and are replaced with other protective covers. The protective covers 5002, 5202, 5302 are adapted to the size of the furnace.

The heating coils 5001 can consist of or comprise a plurality of independently actuatable heating coils 5001A and 5001B. Because said coils are independently actuatable, a suitable, e.g. homogeneous, temperature (distribution) can be obtained inside the furnace or inside the protective cover 5002. In addition to its function of reducing the severity of a gob bursting open, the protective cover 5002 contributes to this desired temperature distribution. The protective cover for example consists of or comprises silicon carbide.

Figure 14:
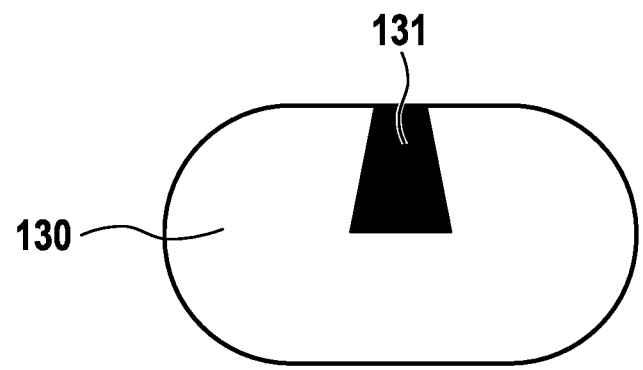
FIG. 14 shows an exemplary blank before entering a temperature-control apparatus.
Figure 15:
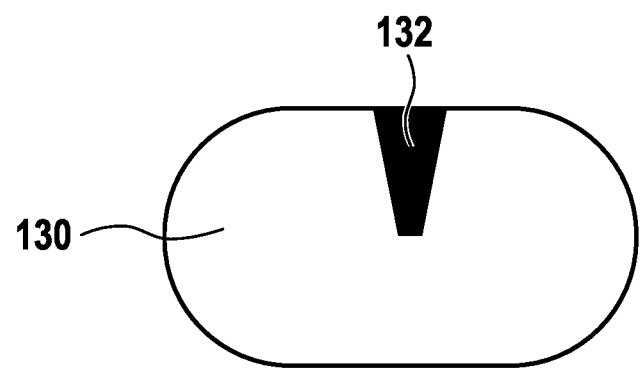
FIG. 15 shows an exemplary blank having a reversed temperature gradient after leaving a temperature-control apparatus.

As explained below with reference to FIGS. 14 and 15, the process steps 123 and 124 are coordinated with one another such that a reversal of the temperature gradient is obtained. In this case, FIG. 14 shows an exemplary blank 130 before entering the cooling apparatus 5 and FIG. 15 shows the blank 130 with a reversed temperature gradient after leaving the heating apparatus 6. While the blank is hotter inside than outside before the process step 123 (with a continuous temperature curve), it is hotter outside than inside after the process step 124 (with a continuous temperature curve). The wedges denoted by reference signs 131 and 132 symbolize the temperature gradients here, wherein the width of a wedge 131 or 132 symbolizes a temperature.

Figure 12:
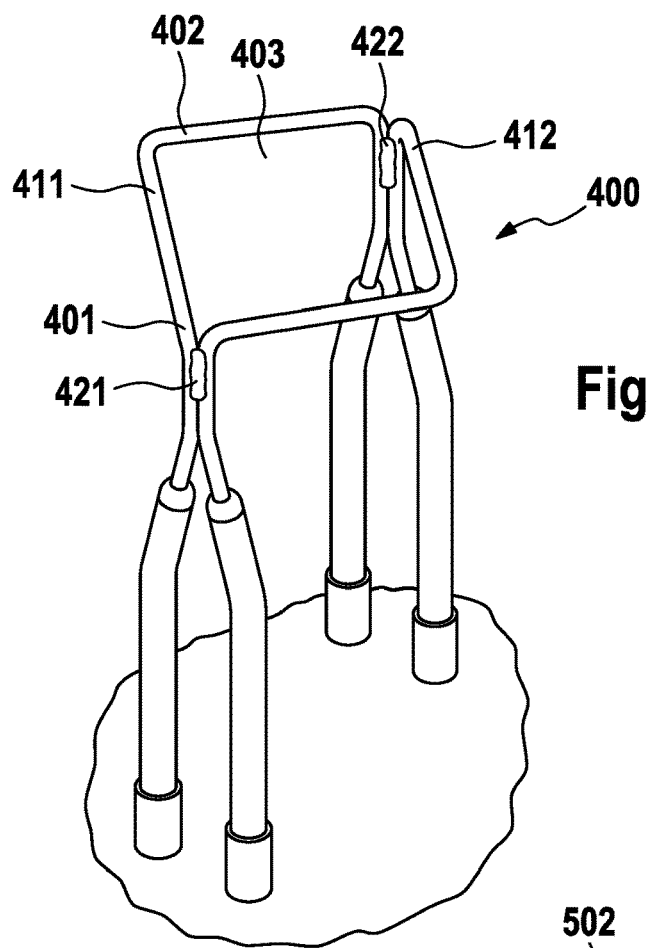
FIG. 12 shows an embodiment of a lance.
Figure 13:
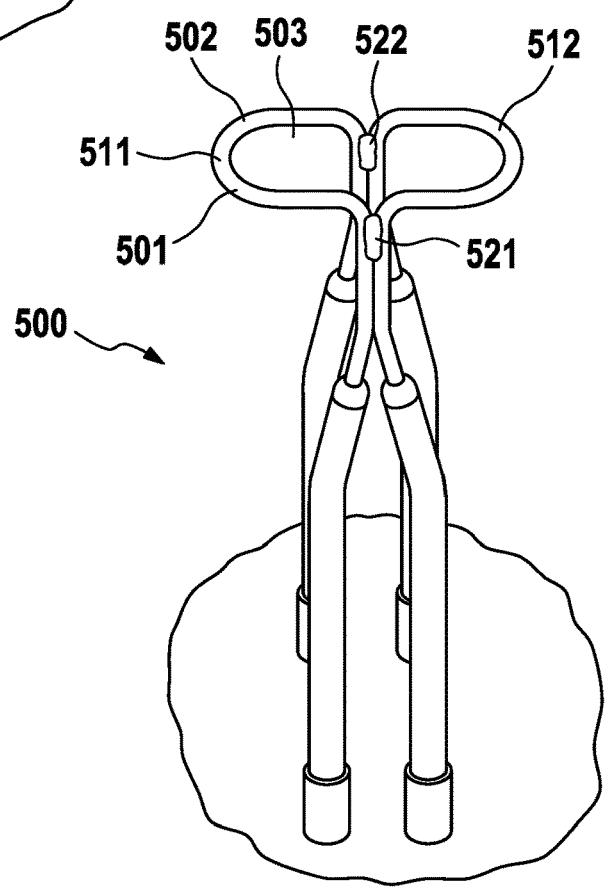
FIG. 13 shows another embodiment of a lance.

In order to reverse its temperature gradient, According to an illustrative embodiment a blank resting on a cooled lance (not shown) is moved through the temperature-control device comprising the cooling apparatus 5 and the heating apparatus 6 (for example substantially continuously) or is held in the cooling apparatus 5 and/or the heating apparatus 6. A cooled lance is disclosed in DE 101 00 515 A1 and in DE 101 16 139 A1. Depending on the shape of the blank, for example FIGS. 12 and 13 show suitable lances. For example, coolant flows through the lance in accordance with the counterflow principle. Alternatively or additionally, it may be provided that the coolant is additionally and/or actively heated.

For the term "lance", the term "support device" is used in the following. The support device 400 shown in FIG. 12 comprises a carrier body 401 having a hollow cross section and an annular support surface 402. The carrier body 401 is tubular at least in the region of the support surface 402 and is uncoated at least in the region of the support surface 402. The diameter of the hollow cross section of the carrier body 401, at least in the region of the support surface 402, is no less than 0.5 mm and/or no greater than 1 mm. The external diameter of the carrier body 401, at least in the region of the support surface, is no less than 2 mm and/or no greater than 3 mm. The support surface 402 spans a square base surface 403 having rounded corners. The carrier body 401 comprises two flow channels 411 and 412 for the coolant flowing therethrough, which each only extend over a section of the annular support surface 402, wherein the flow channels 411 and 412 are connected in a region in which they leave the support surface 402 by means of metal filler material 421 and 422, for example solder.

The support device 500 shown in FIG. 13 comprises a carrier body 501 having a hollow cross section and an annular support surface 502. The carrier body 501 is tubular at least in the region of the support surface 502 and is uncoated at least in the region of the support surface 502. The diameter of the hollow cross section of the carrier body 501, at least in the region of the support surface 502, is no less than 0.5 mm and/or no greater than 1 mm. The external diameter of the carrier body 501, at least in the region of the support surface, is no less than 2 mm and/or no greater than 3 mm. The support surface 502 spans an oval base surface 503. The carrier body 501 comprises two flow channels 511 and 512 for the coolant flowing therethrough, which each only extend over a section of the annular support surface 502, wherein the flow channels 511 and 512 are connected in a region in which they leave the support surface 502 by means of metal filler material 521 and 522, for example solder.

It may be provided that, after passing through the cooling apparatus 5, blanks are removed and are supplied by means of a transport apparatus 41, for example, to an intermediate storage unit (e.g. in which they are stored at room temperature). In addition, it may be provided that blanks are conducted to the transfer station 4 by means of a transport apparatus 42 and are phased into the continuing process by heating in the heating apparatus 6 (for example starting from room temperature).

Figure 9A:
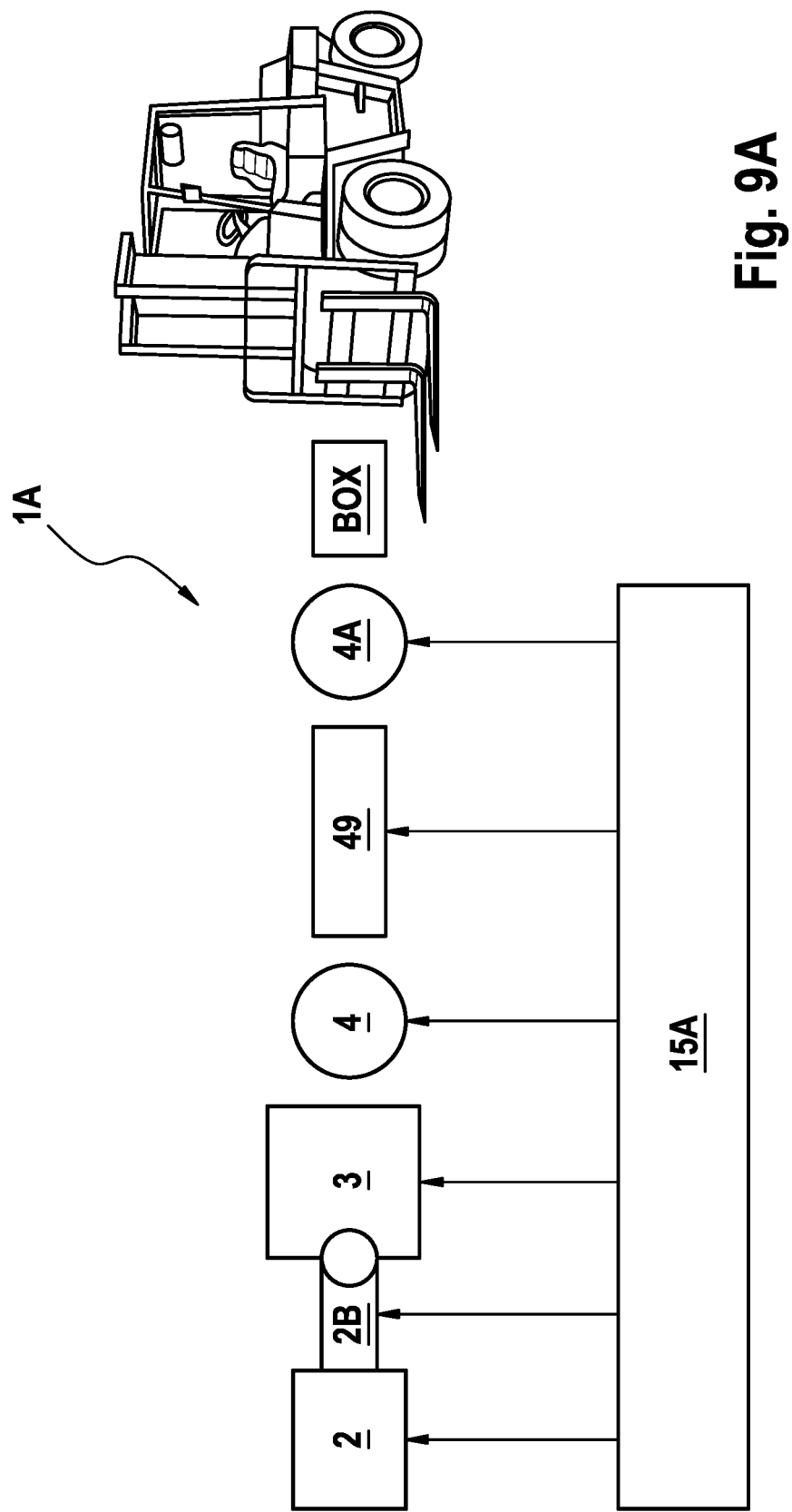
FIG. 9A is a schematic view of a device for producing gobs or optical elements made of glass.
Figure 10:
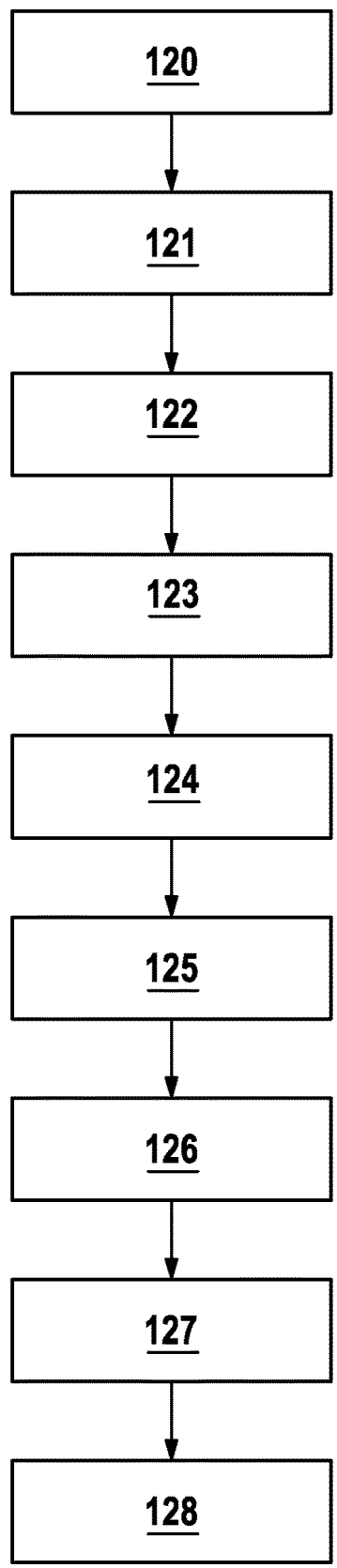
FIG. 10 shows an exemplary sequence of a method for producing motor-vehicle headlight lenses or lens-like free-forms for a motor-vehicle headlight or optical elements made of glass.

In a departure from the method described with reference to FIG. 10, in the method described with reference to FIG. 11, the process step 121 is followed by the process step 122', in which the cast gob is transferred to a cooling path 49 of the device 1A, as shown in FIG. 9A, by means of a transfer station 4. In this sense, a cooling path is for example a conveying apparatus, such as a conveyor belt, through which a gob is guided and is cooled in the process, with the addition of heat. The cooling is carried out to a certain temperature above room temperature or to room temperature, wherein the gob is cooled down to room temperature in the cooling path 49 or outside the cooling path 49. It is for example provided that a gob rests on a base made of graphite or a base containing graphite in the cooling path 49.

Figure 11:
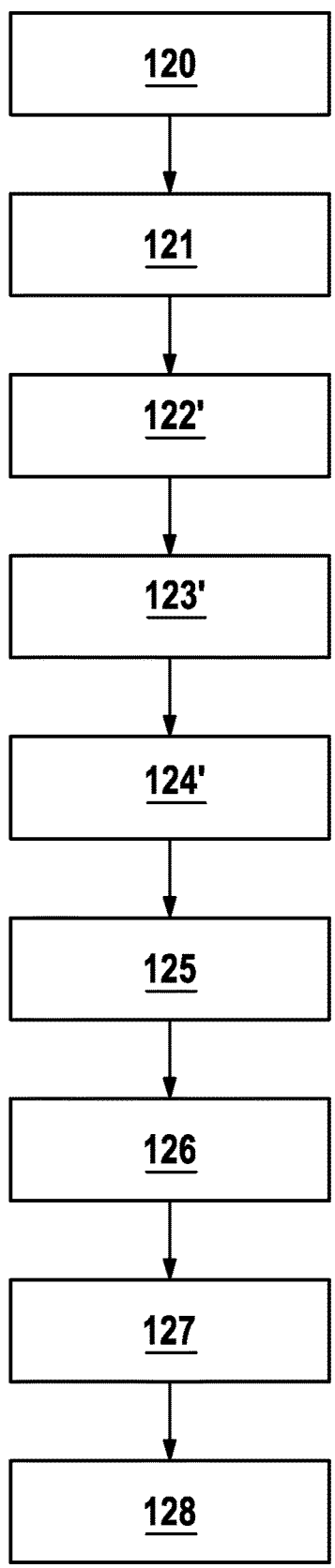
FIG. 11 shows an alternative sequence of a method for producing motor-vehicle headlight lenses or lens-like free-forms for a motor-vehicle headlight or optical elements made of glass.

In the subsequent process step 123' according to FIG. 11, the gobs are supplied to a device 1B. The devices 1A and 1B according to FIGS. 9A and 9B may be in close proximity to one another, but may also be further away from one another. In the latter case, a transfer station 4A transfers the gobs from the cooling path 49 to a transport container BOX. The gobs are transported in the transport container BOX to the device 1B, in which a transfer station 4B removes the gobs from the transport container BOX and passes them to a hood-type annealing furnace 5000. The gobs are heated in the hood-type annealing furnace 5000 (process step 124').

A press 8, onto which a blank is transferred by means of a transfer station 7, is provided behind the heating apparatus 6 or 5000. The blank is press-molded, on both sides, to form the headlight lens S200 in a process step 125 by means of the press 8. A suitable mold set is disclosed e.g. in EP 2 104 651 B1. The pressing station PS is part of the press 8 according to FIG. 8 and/or 9B.

Figure 21:
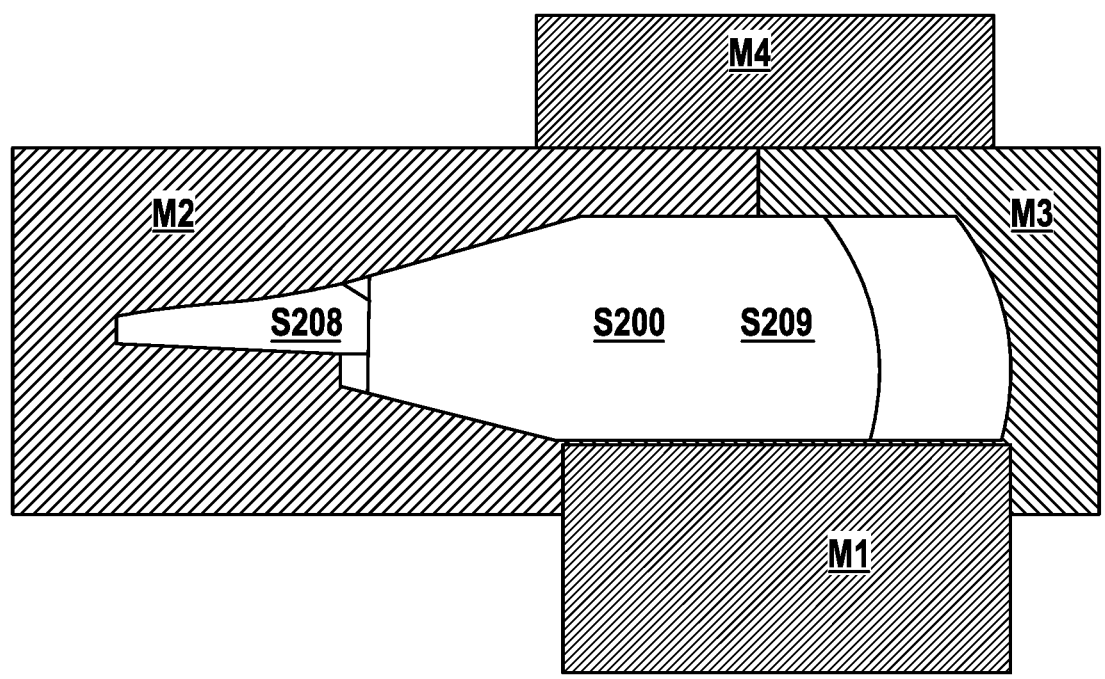
FIG. 21 shows a mold set for press-molding a headlight lens according to FIGS. 4, 5 and 6.

FIG. 21 shows a mold set for press-molding an above-mentioned headlight lens S200, wherein the production method is explained on the basis of the mold set. In this process, a blank is first provided on a first mold. The blank is heated again such that the inside of the blank is cooler than the outside. The temperature difference between the edge or surface of the blank and the center of the blank is for example between 50° C. and 300° C. immediately before pressing. The temperature difference between the upper surface of the blank and the lower surface of the blank is for example between 50° C. and 300° C. immediately before pressing. The first partial mold M1 is substantially vertical movable, and specifically so as to be controlled and/or regulated in terms of pressure and/or force, such that the path covered by the first partial mold M1 when compressing or pressing or press-molding the headlight lens S200 is dependent on the resistance to which the first partial mold M1 is subjected. In addition, a second partial mold M2 and a third partial mold M3 are provided which, when pressing the headlight lens S200, are moved towards one another in order to press the blank to form a headlight lens S200. In this process, the second partial mold M2 and the third partial mold M3 move orthogonally to the first mold, i.e. for example horizontally. The second partial mold M2 and the third partial mold M3 are regulated or controlled in distance or speed, i.e. they move towards one another at a predetermined speed or over predetermined distance, wherein the force for the pressing is set. In addition, a ram M4 presses against the closed mold, comprising the second partial mold M2 and the third partial mold M3. The ram M4 presses in the opposite direction to the first partial mold M1. The first partial mold M1 is used to mold a part of the light-passage section S209 in the same way as the third partial mold M3. The second partial mold M2 is used to mold the light tunnel S208 and a part of the light-passage section S209. The partial mold M1 comprises four protrusions, by means of which the orienting structures in the form of indentations S210 are formed on the underside of the headlight lens S200.

Figure 22:
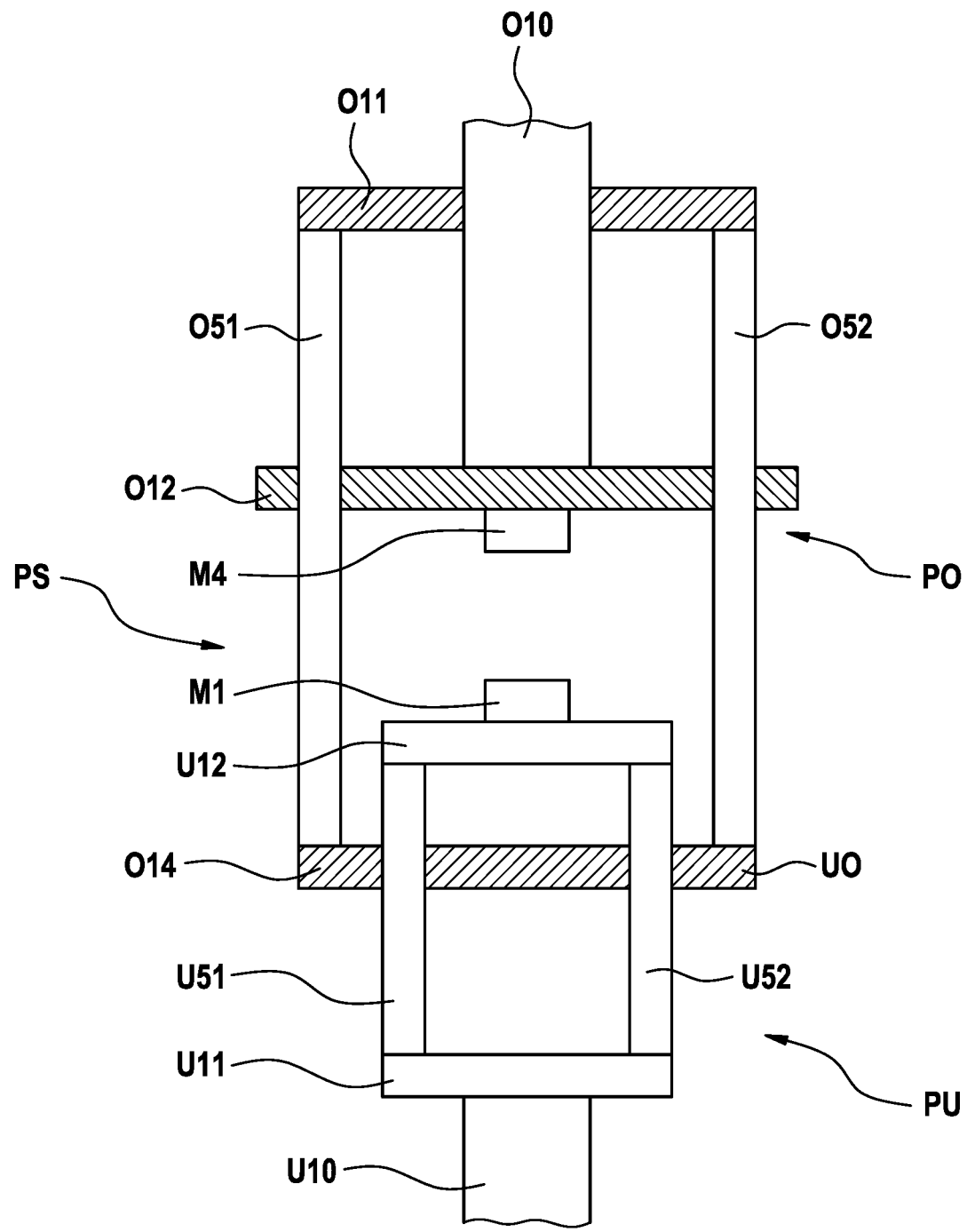
FIG. 22 is a schematic view of a pressing station for pressing a headlight lens from a heated blank.

FIG. 22 is a schematic view of a pressing station PS as part of the press 8 for pressing a headlight lens from a heated blank, without showing the partial mold M2 and the partial mold M3. The pressing station PS comprises an upper pressing unit PO and a lower pressing unit PU. For the pressing, the ram M4, which is moved by means of a press drive or by means of an actuator O10, and the partial mold M1, which is moved by means of a press drive or by means of an actuator U10, are moved towards one another. The ram M4 is connected to a mold-side movable connector O12, which is in turn connected to an actuator-side movable connector O11 by means of movable guide rods O51, O52. The actuator U10 is in turn connected to the actuator-side movable connector U11, such that the partial mold M1 is movable by means of the actuator U10. The movable guide rods U51 and U52 extend through recesses in a fixed guide element UO such that any displacement or movement of the movable guide rods U51 and U52 and therefore of the partial mold M1 perpendicularly to the movement direction is prevented or reduced or limited.

The pressing unit PO comprises an actuator O10, which moves the ram M4 and is connected to a movable guide element O12. The pressing unit PO also comprises a frame, which is formed by an actuator-side fixed connector O11 and a mold-side fixed connector O14 as well as fixed guide rods O51 and O52, which connect the actuator-side fixed connector O11 to the mold-side fixed connector O14. The fixed guide rods O51 and O52 are guided through recesses in the movable guide element O12, such that they prevent, reduce or avoid any movement or deflection of the ram M4 orthogonally to the movement direction of the actuator O10 or ram M4.

In the embodiment shown, the pressing units PO and PU are linked in that the fixed guide element UO is identical to the mold-side fixed connector O14. By linking or chaining the two pressing units PO and PU of the pressing station PS together, high quality of the headlight lenses S200 to be pressed is achieved.

Figure 23:
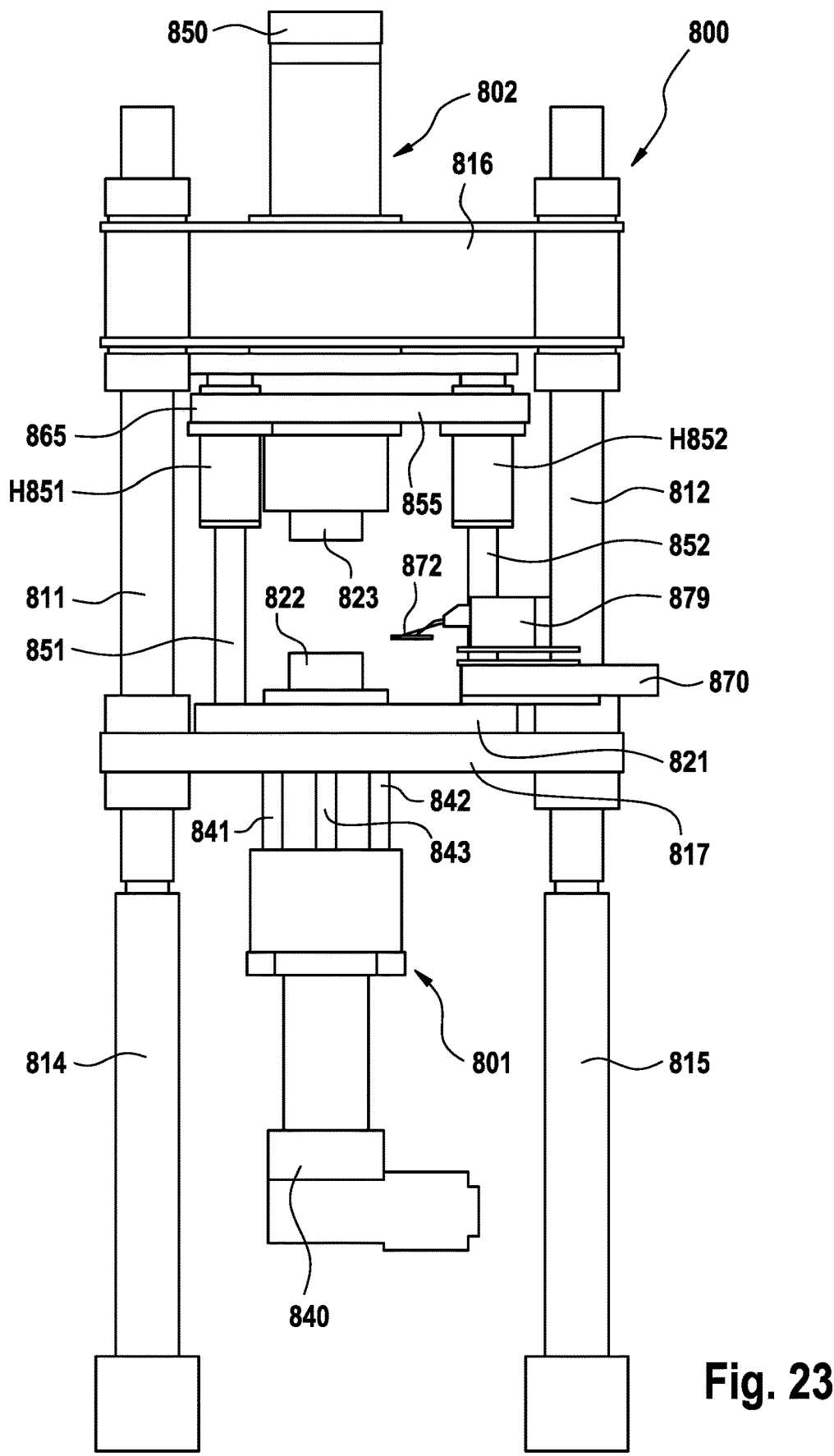
FIG. 23 shows another embodiment of a pressing station.

FIG. 23 shows an implementation of the pressing station PS. The corresponding pressing station 800 comprises a lower pressing unit 801 and an upper pressing unit 802 (see FIG. 23), wherein FIG. 23 shows an embodiment of a pressing station 800, by means of which for example headlight lenses can be pressed in a suitable manner. The pressing unit 801 is an embodiment of the lower pressing unit PU in FIG. 22 and the pressing unit 802 is an embodiment of the upper pressing unit PO in FIG. 22. The pressing station 800 comprises a pressing frame, which, in an exemplary configuration, comprises the interconnected rods 811 and 814 as well as the interconnected rods 812 and 815. The rods 811 and 812 are interconnected by a lower plate 817 and an upper connection part 816 and thus form a pressing frame, which receives the lower pressing unit 801 and the upper pressing unit 802.

The lower pressing unit 801 comprises a press drive 840 corresponding to the actuator U10, by means of which drive three rods 841, 842, 843 are movable, in order to move a lower press mold 822 that is coupled to the rods 841, 842, 843 and corresponds to the partial mold M1. The rods 841, 842, 843 are guided through bores or holes (not shown) in the plate 817 and the plate 821, which prevent or considerably reduce a deviation or movement of the press mold 822 in a direction orthogonal to the movement direction. The rods 841, 842, 843 are embodiments of the movable guide rods U51 and U52 according to FIG. 20. The plate 817 is a configuration or implementation of the fixed guide element UO.

Figure 24:
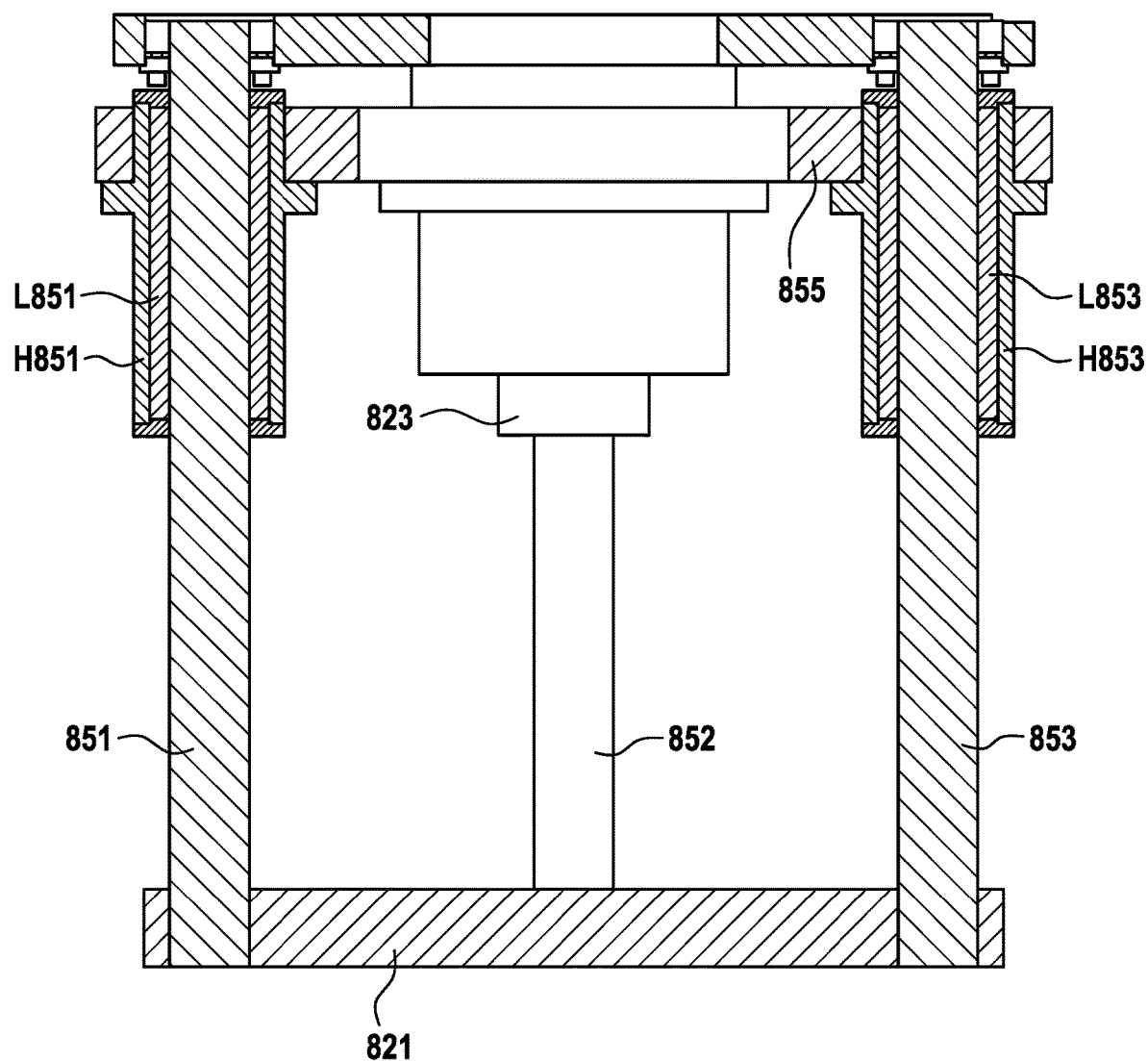
FIG. 24 shows a detail of a pressing station.

The upper pressing unit 802 comprises a press drive 850 which corresponds to the actuator O10 and is held by the upper connection part 816, which corresponds to the actuator-side fixed connector O11. A plate 855 which corresponds to the movable guide element O12 and comprises guide rods 851, 852 and 853 as well as an upper press mold 823 is guided by means of the press drive 850. The guide rods 851, 852 and 853 according to FIGS. 23 and 24 correspond to the fixed guide rods O51 and O52 in FIG. 20. The ram 823 corresponds to the ram M4 in FIGS. 21 and 22. For the guidance, sleeves H851, H852 and H853 comprising bearings L851 and L853 are also provided as an implementation of the recesses in the movable guide plate O12 from FIG. 20, which surround the guide rods 851, 852 and 853. The plates 821 and 817 are fixed to one another and thus form the fixed guide element UO (plate 817) and the mold-side fixed connector O14 (plate 821).

Reference sign 870 denotes a movement mechanism by means of which an induction heater 879 comprising an induction loop 872 can be moved towards the lower mold 822 (corresponding to the partial mold M1) in order to heat it by means of the induction loop 872. After the heating by means of the induction loop 872, the induction heater 871 is moved back into its starting position again. A blank (gob) is placed on the partial mold 822 and, by moving the partial molds 822 and 823 towards one another, is press-molded (on both sides) to form a headlight lens, wherein the mold 822 or M1 pushes upwards and the ram 823 or M4 pushes downwards in order to produce a counter-pressure for pressing the partial mold 822 or M1. For the sake of clarity, the partial molds M2 and M3 are not shown in FIG. 22, 23 or 24 and neither are their movement mechanisms.

The partial molds M1, M2 and M3 and the ram M4 in FIGS. 21, 22, 23 and 24 are not necessarily shown to scale for the sake of simplicity and clarity. Therefore, for example, the scales are exaggerated or simplified in order to improve the understanding of the embodiment. Where coordinate systems are used in the drawings, these originate from the point at which the optical axis of the headlight lens passes through the light entry surface, even if these coordinate systems are shifted for the sake of clarity such that the origin thereof that is shown does not correspond to the actual origin.

Figure 25:
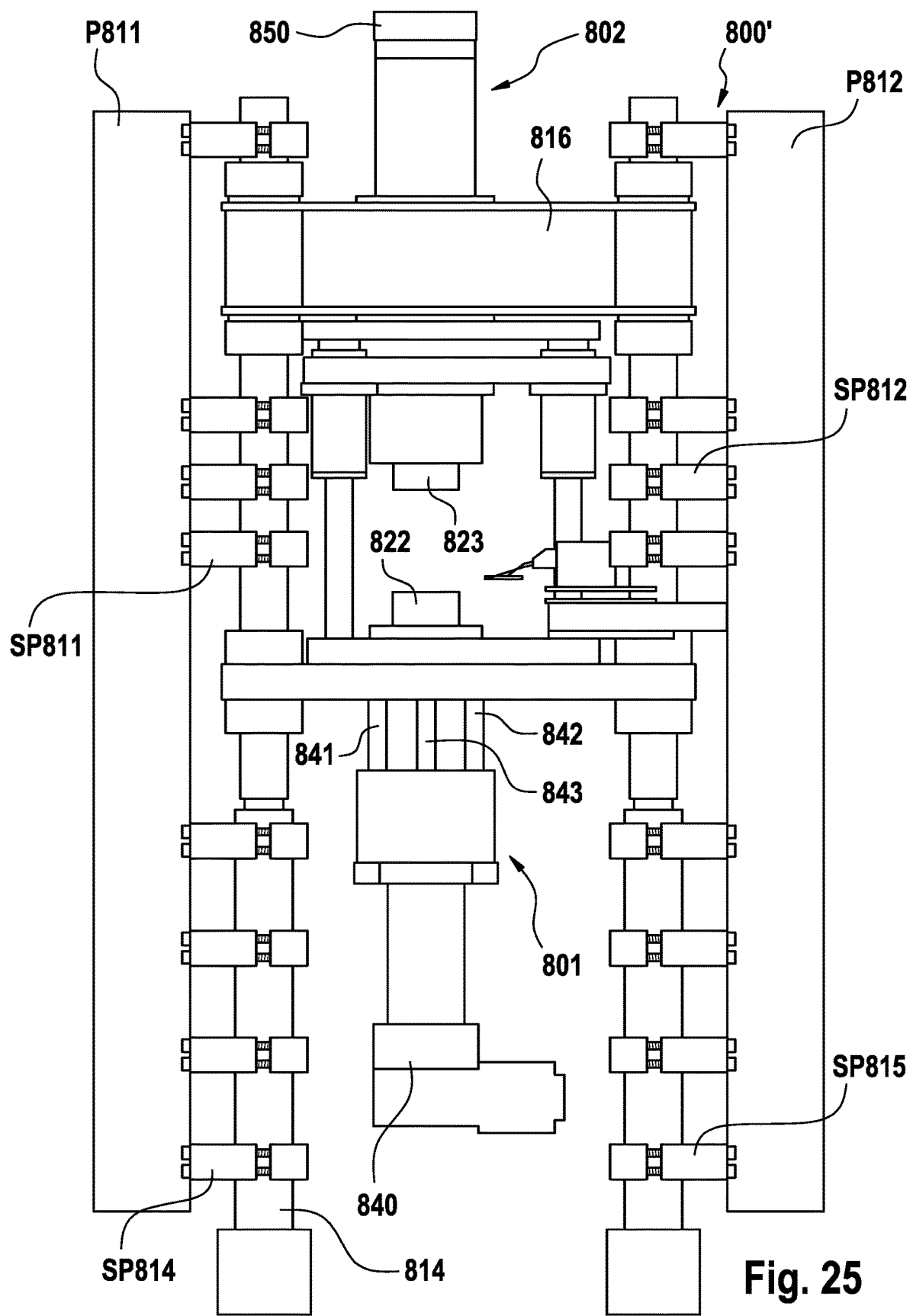
FIG. 25 is a schematic view of a pressing station, modified with respect to the pressing station according to FIG. 22, for pressing a headlight lens from a heated blank.
Figure 26:
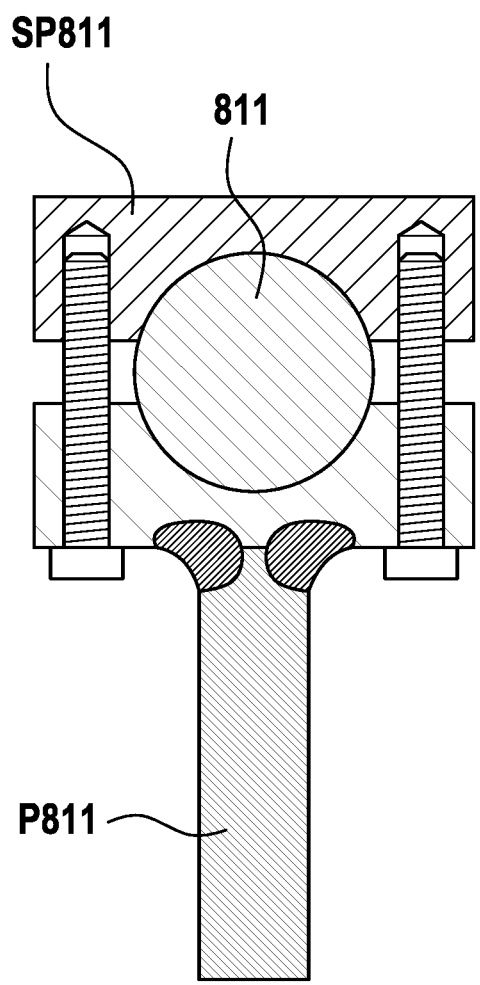
FIG. 26 is a view of a detail of the pressing station according to FIG. 25.

FIG. 25 shows another pressing station 800'. In a modification to the pressing station 800, a reinforcement profile P811, P812 is for example provided for each of the rods 811, 812 or the rods 814, 815, wherein the reinforcement profile P811, P812 is connected to the rods 811, 812, 814, 815 by means of clamps SP811, SP812, SP814, SP815. FIG. 26 is a view of a detail of a clamp SP811 of this kind, wherein one half of the clamp SP811 is welded to the reinforcement profile P811.

Figure 27:
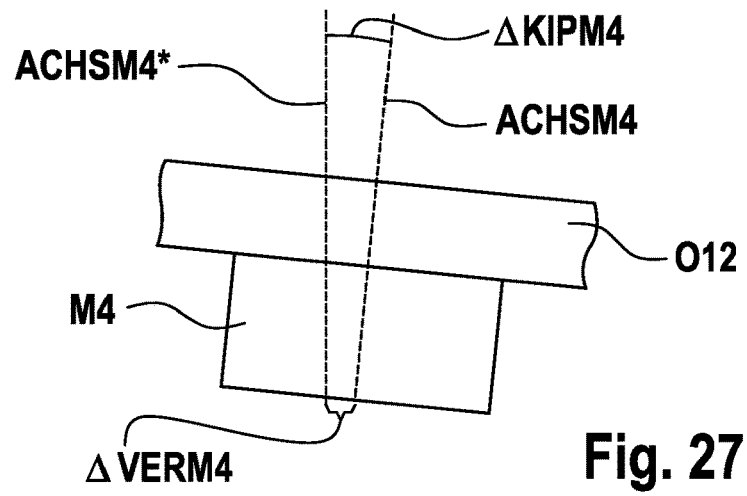
FIG. 27 is a schematic view for explaining tilting and radial offset relative to a ram of the mold set according to FIG. 21.

The components are for example coordinated with one another and/or dimensioned such that the maximum tilting ΔKIPM4 or the maximum angle of the tilting of the ram M4 (corresponding to the angle between the target pressing direction ACHSM4* and the actual pressing direction ACHSM4), as shown in FIG. 27, is no greater than $10^{-2\circ}$, for example no greater than $5 \cdot 10^{-3\circ}$. Furthermore, it is provided that the radial offset ΔVERM4, i.e. the offset of the ram M4 from its target position in the direction orthogonal to the target pressing direction ACHSM4*, is no greater than 50 μm, for example no greater than 30 μm, or no greater than 20 μm, or no greater than 10 μm.

Figure 28:
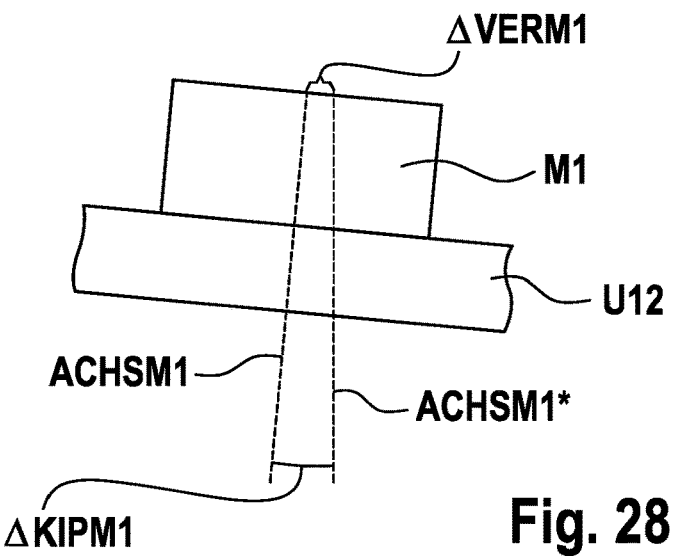
FIG. 28 is a schematic view for explaining tilting and radial offset relative to a partial mold used as the lower mold.

The components are for example coordinated with one another and/or dimensioned such that the maximum tilting ΔKIPM1 or the maximum angle of the tilting of the partial mold M1 (=angle between the target pressing direction ACHSM1* and the actual pressing direction ACHSM1), as shown in FIG. 28, is no greater than $10^{-2\circ}$, for example no greater than $5 \cdot 10^{-3\circ}$. Furthermore, it is provided that the radial offset ΔVERM1, i.e. the offset of the partial mold M1 from its target position in the direction orthogonal to the target pressing direction ACHSM1*, is no greater than 50 μm, for example no greater than 30 μm, or no greater than 20 μm, or no greater than 10 μm.

Figure 29:
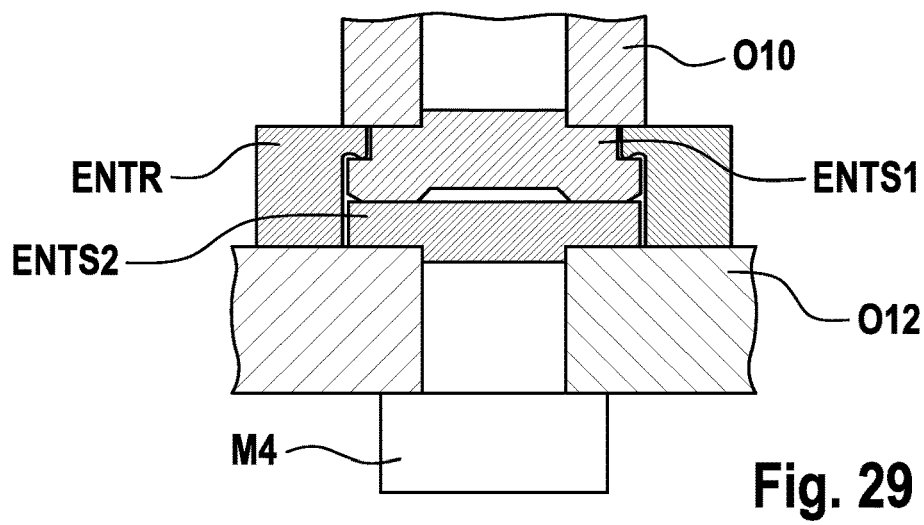
FIG. 29 shows an embodiment of a decoupling element for torsion.

Additionally or alternatively, it may be provided that the actuator O10 is decoupled from torsion from the movable guide element O12 comprising the ram M4. In addition, it may be provided that the actuator U10 is also decoupled from torsion from the mold-side movable connector U12 together with the partial mold M1. FIG. 29 shows decoupling of this kind on the basis of the example of decoupling the actuator O10 from the mold OF together with the movable guide element O12. The decoupler, which comprises the ring ENTR and the discs ENTS1 and ENT2, prevents any torsion from the actuator O10 acting on the ram M4.

Figure 30:
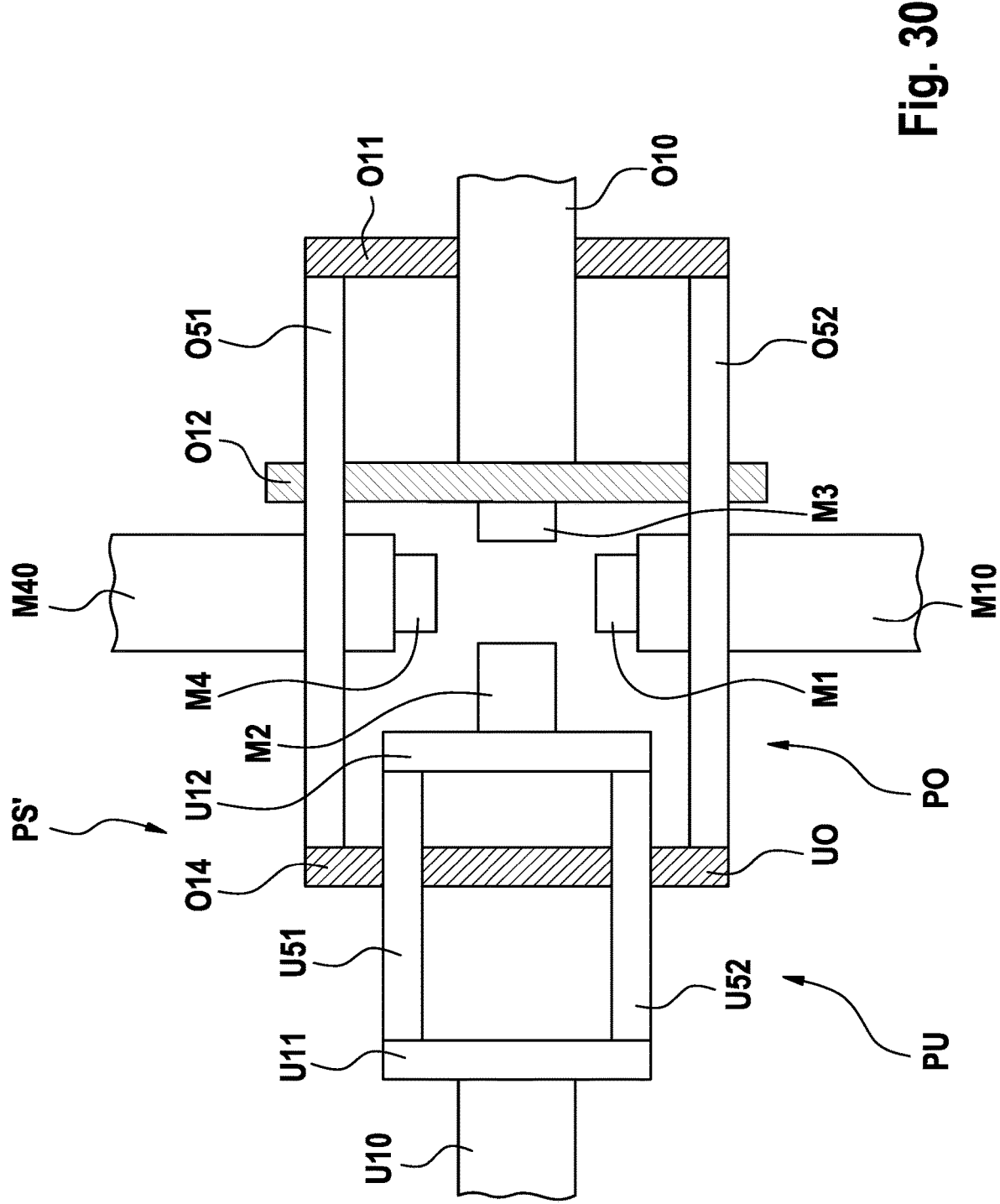
FIG. 30 is a schematic view of a pressing station for pressing a headlight lens from a heated blank.

FIG. 30 shows an embodiment of pressing station PS' as an alternative to the pressing station PS in 22, wherein similar or identical reference signs denote similar or identical components. In another alternative configuration, which is not explicitly shown, the partial mold M2 is assigned to the pressing unit PO and the partial mold M3 is assigned to the pressing unit PU. In both configurations, the partial mold M1 is a "lower mold" and the ram M4 is an "upper mold".

Figure 31:
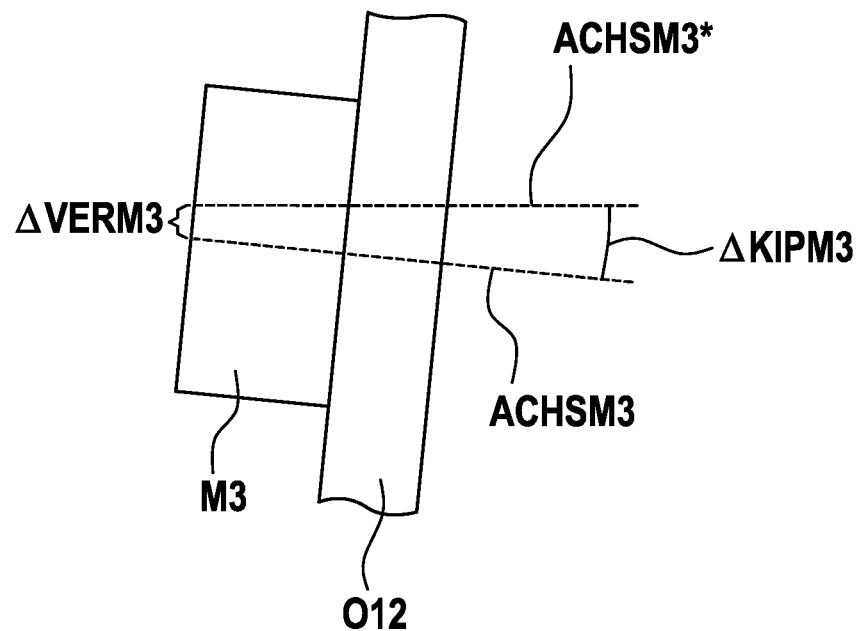
FIG. 31 is a schematic view for explaining tilting and radial offset relative to a partial mold of the mold set according to FIG. 21.

The components are for example coordinated with one another and/or dimensioned such that the maximum tilting ΔKIPM3 or the maximum angle of the tilting of the partial mold M3 (=angle between the target pressing direction ACHSM3* and the actual pressing direction ACHSM3), as shown in FIG. 31, is no greater than $10^{-2\circ}$, for example no greater than $5 \cdot 10^{-3\circ}$. Furthermore, it is provided that the radial offset ΔVERM3, i.e. the offset of the partial mold M3 from its target position in the direction orthogonal to the target pressing direction ACHSM3*, is no greater than 50 μm, for example no greater than 30 μm, or no greater than 20 μm, or no greater than 10 μm.

Figure 32:
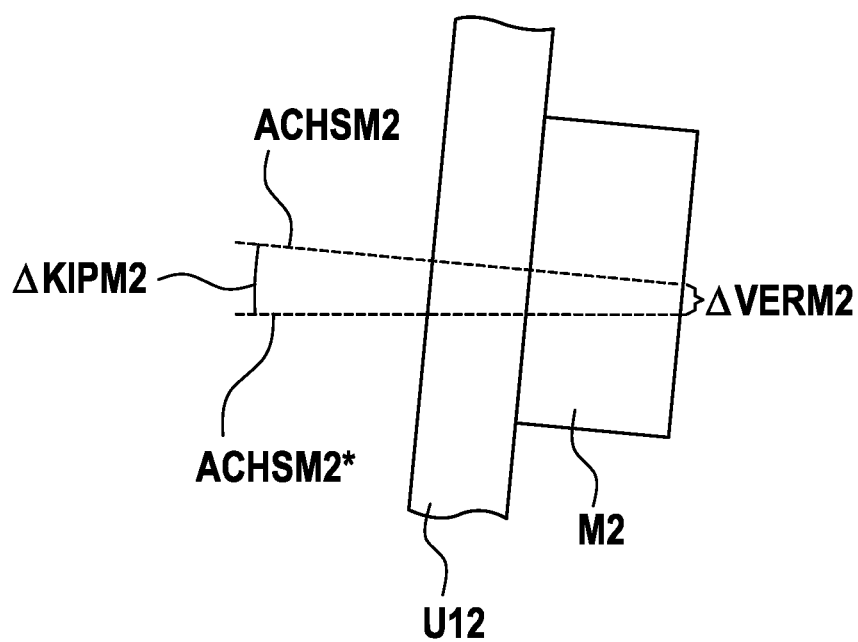
FIG. 32 is a schematic view for explaining tilting and radial offset relative to a partial mold of the mold set according to FIG. 21.

The components are for example coordinated with one another and/or dimensioned such that the maximum tilting ΔKIPM2 or the maximum angle of the tilting of the partial mold M2 (=angle between the target pressing direction ACHSM2* and the actual pressing direction ACHSM2), as shown in FIG. 32, is no greater than $10^{-2\circ}$, for example no greater than $5 \cdot 10^{-3\circ}$. Furthermore, it is provided that the radial offset ΔVERM2, i.e. the offset of the partial mold M2 from its target position in the direction orthogonal to the target pressing direction ACHSM2*, is no greater than 50 μm, for example no greater than 30 μm, or no greater than 20 μm, or no greater than 10 μm.

Additionally or alternatively, it may be provided that the actuator O10 is decoupled from torsion from the movable guide element O12 comprising the partial mold M3. In addition, it may be provided that the actuator U10 is also decoupled from torsion from the mold-side movable connector U12 together with the partial mold M2. FIG. 29 shows decoupling of this kind on the basis of the example of decoupling the actuator O10 from the partial mold M4 together with the movable guide element O12. The decoupler, which surrounds the ring ENTR and the discs ENTS1 and ENT2, prevents any torsion from the actuator O10 acting on the partial mold M3.

In a process step 126, the headlight lens S200 is moved through a surface-treatment station 45 on the transport element. In this process, the optically active surface S202 of the headlight lens S200 is for example sprayed with surface-treatment agent by means of a dual-substance nozzle. The spraying process lasts no longer than 12 seconds, for example no longer than 8 seconds, for example no less than 2 seconds. The dual-substance nozzle comprises an inlet for atomizing air and an inlet for liquid, in which the surface-treatment agent is supplied, which is converted into a mist or spray mist by means of the atomizing air and exits through a nozzle. In order to control the dual-substance nozzle, a control air port is also provided, which is actuated by means of the control assembly 15 described below.

By means of the proposed method for producing an optical element or a headlight lens S200, weather resistance and/or hydrolytic resistance comparable to that of borosilicate glass is obtained.

Furthermore, the costs of the production process are only slightly higher than those of the production process for optical elements or headlight lenses having weather resistance and/or hydrolytic resistance corresponding to soda-lime glass.

The transport element together with the headlight lens S200 is then placed on the cooling path 10 by means of a transfer station. In a process step 127, the headlight lens S200 is cooled by means of the cooling path 10. At the end of the cooling path 10, a removal station 11 is provided, which removes the transport element together with the headlight lens S200 from the cooling path 10. In addition, the removal station 11 separates the transport element and the headlight lens S200 and transfers the transport element to a return transport apparatus 43. From the return transport apparatus 43, the transport element is transferred by means of the transfer station 9 to the heating station 44, in which the transport element is heated.

A process step 128 lastly follows, in which residues of the surface-treatment agent on the lens are washed away in a washing station 46.

The device shown in FIG. 8 also comprises a control assembly 15 for controlling and/or regulating the device 1 shown in FIG. 8. The device 1A shown in FIG. 9A also comprises a control assembly 15A for controlling and/or regulating the device 1A shown in FIG. 9A. The device 1B shown in FIG. 9B also comprises a control assembly 15B for controlling and/or regulating the device 1B shown in FIG. 9B. The control assemblies 15, 15A and 15B for example ensure that the individual process steps are continuously interlinked.

LIST OF REFERENCE SIGNS

1, 1A, 1B device
2 melting unit
2B adjustable outlet
3 preform device
4, 4A, 4B transfer station
5 cooling apparatus
6 heating apparatus
7 transfer station
8 pressing station
9 transfer station
10 cooling path
11 removal station
15, 15A, 15B control assembly
20 motor vehicle
41 transport apparatus
42 transport apparatus
43 return transport apparatus
44 heating station
45 surface-treatment station
45o dual-substance nozzle
45u dual-substance nozzle
46 washing station
49 cooling path
120 process step
121 process step
122, 122' process step
123, 123' process step
124, 124' process step
125 process step
126 process step
127 process step
128 process step
130 blank
131 temperature gradient
132 temperature gradient
400, 500 support devices
401, 501 carrier body
402, 502 support surface
403, 503 base surface
411, 511 flow channels
412, 512 flow channels
421, 521 metal filler material
422, 522 metal filler material
800 pressing station
801 pressing unit
802 pressing unit
811, 812, 814, 815 rod
816 upper connection part
817 lower plate
821 plate
822 lower press mold
823 upper press mold
840 press drive
841, 842, 843 rods
850 press drive
851, 852, 853 guide rod
H851, H852, H853 sleeves
L851, L853 bearing
855 plate
870 movement mechanism
872 induction loop
879 induction heater
4001 gob
4002 nut
5000 hood-type annealing furnace
5001, 5001A, 5001B heating coil
5002 protective cover
5112 cylindrical region
5132 rounded region
5122 covering region
GF casting mold
GF1 first casting-mold part
GF2 second casting-mold part
GFK casting-mold cavity
GFS ram
M1 partial mold
M2 partial mold
M3 partial mold
M4 ram
OE1 pressed part
OE2 optical element
OE21 edge
OE3 handle
OE31 base
OE32 stem
PS pressing station
PO upper pressing unit
PU lower pressing unit
OF upper mold
UF lower mold
U10, O10 actuator
U11, U12 connector
U51, U52 movable guide rods
UO fixed guide element
O11 actuator-side connector
O12 guide element
O14 mold-side connector
O51, O52 fixed guide rods
P811, P812 reinforcement profile
SP811, SP812,
SP814, SP815 clamps
ΔKIPM4, ΔKIPM1,
ΔKIPM3, ΔKIPM2 maximum tilting
ACHSM4, ACHSM1,
ACHSM2, ACHSM3 actual pressing direction
**ACHSM4\*, ACHSM1\***
**ACHSM2\*, ACHSM3\*** target pressing direction
ΔVERM4, ΔVERM1,
ΔVERM2, ΔVERM3 vertical offset
ENTR ring
ENTS1, ENTS2 discs
BALG bellows
S1 motor vehicle
S10, S20 motor-vehicle headlight
S11 light source S11 A carrier
S21 light source
S21A carrier
S100, S200 headlight lens
vS201 light entry surface
S102, S202 light exit surface
S107, S207 bend
S108, S208 light tunnel
S109, S209 light-passage section
S210 orienting element

The invention claimed is:

1. A method of producing a headlight lens for a vehicle headlight, the method comprising:
provSiding a first partial mold; providing a second partial mold; providing at least a third partial mold; providing a ram;
press-molding a heated blank of glass between the first partial mold, the second partial mold, and the third partial mold to form a headlight lens having an integral body made of glass, the integral body comprising at least one light tunnel and a light-passage section having at least one optically active light exit surface, wherein the light tunnel comprises at least one light entry surface and, with a bend, transitions into the light-passage section configured to image the bend as a bright-dark-boundary by means of light directed into the light entry surface, wherein the press-molding comprises:
molding the light tunnel, the bend, and at least a portion of the light-passage section by means of the second partial mold;
molding at least a portion of the light-passage section by means of the first partial mold and the third partial mold;
moving the second partial mold and the third partial mold towards each other; and
during press-molding, pressing the ram against the second partial mold and the third partial mold, the direction of pressing being orthogonal to the direction of movement of the second partial mold and the third partial mold.

2. The method of claim 1 further comprising:
moving the second partial mold at a predetermined velocity.

3. The method of claim 2, further comprising:
moving the third partial mold at a predetermined velocity.

4. The method of claim 3, further comprising:
moving the first partial mold in a direction that is counter to the direction of pressing of the ram.

5. The method of claim 2, further comprising:
moving the first partial mold orthogonal to the direction of movement of the second partial mold; and
moving the first partial mold orthogonal to the direction of movement of the third partial mold.

6. The method of claim 1 further comprising:
moving the second partial mold over a predetermined distance.

7. The method of claim 6, further comprising:
moving the third partial mold over a predetermined distance.

8. The method of claim 7, further comprising:
moving the first partial mold in a direction that is counter to the direction of pressing of the ram.

9. A method of producing a headlight lens for a vehicle headlight, the method comprising:
providing a first partial mold; providing a second partial mold; providing at least a third partial mold;
press-molding a heated blank of glass between the first partial mold, the second partial mold, and the third partial mold to form a headlight lens having an integral body made of glass, the integral body comprising at least one light tunnel and a light-passage section having at least one optically active light exit surface, wherein the light tunnel comprises at least one light entry surface and, with a bend, transitions into the light-passage section configured to image the bend as a bright-dark-boundary by means of light directed into the light entry surface, wherein the press-molding comprises:
molding the light tunnel, the bend, and at least a portion of the light-passage section by means of the second partial mold;
molding at least a portion of the light-passage section by means of the first partial mold and the third partial mold;
moving the second partial mold and the third partial mold towards each other;
moving the first partial mold orthogonal to the direction of movement of the second partial mold; and
moving the first partial mold orthogonal to the direction of movement of the third partial mold.

10. The method of claim 9 further comprising:
moving the second partial mold at a predetermined velocity.

11. The method of claim 10, further comprising:
moving the third partial mold at a predetermined velocity.

12. The method of claim 9, further comprising:
moving the second partial mold over a predetermined distance.

13. The method of claim 12, further comprising:
moving the third partial mold over a predetermined distance.

14. A method of producing a headlight lens for a vehicle headlight, the method comprising:
providing a first partial mold;
providing a second partial mold;
providing at least a third partial mold; providing a ram;
providing an actuator, a mold and the actuator being connected by means of a first movable guide rod and at least a second movable guide rod, wherein the first movable guide rod is guided in a recess in a fixed guide element and the second movable guide rod is guided in a recess in the fixed guide element, the mold being selected from the group consisting of the first partial mold; the second partial mold;
and the third partial mold; and
press-molding the heated blank of glass between the first partial mold, the second partial mold, the third partial mold to form a headlight lens having an integral body made of glass, the integral body comprising at least one light tunnel and a light-passage section having at least one optically active light exit surface, wherein the light tunnel comprises at least one light entry surface and, with a bend, transitions into the light-passage section configured to image the bend as a bright-dark-boundary by means of light directed into the light entry surface; and wherein the press-molding comprises:
molding the light tunnel, the bend, and a portion of the light-passage section by means of the second partial mold; and
molding at least a portion of the light-passage section by means of the first partial mold and the third partial mold.

15. The method of claim 14, the press-molding further comprising:

pressing the ram against the second partial mold and the third partial mold.

* * * * *